United States Patent
Tani et al.

(10) Patent No.: US 7,173,347 B2
(45) Date of Patent: Feb. 6, 2007

(54) METHOD AND APPARATUS FOR DRIVING AND CONTROLLING ON-VEHICLE LOADS

(75) Inventors: Keisuke Tani, Kariya (JP); Kazuyoshi Obayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 354 days.

(21) Appl. No.: 10/683,276

(22) Filed: Oct. 14, 2003

(65) Prior Publication Data

US 2004/0124703 A1 Jul. 1, 2004

(30) Foreign Application Priority Data

| Oct. 15, 2002 | (JP) | ............................... 2002-300337 |
| Oct. 25, 2002 | (JP) | ............................... 2002-311466 |
| Jun. 27, 2003 | (JP) | ............................... 2003-185651 |

(51) Int. Cl.
  *B60L 1/00* (2006.01)
  *B60L 3/00* (2006.01)
(52) U.S. Cl. ........................................ 307/10.1; 307/9.1
(58) Field of Classification Search ............... 307/10.1, 307/9.1
See application file for complete search history.

(56) References Cited

U.S. PATENT DOCUMENTS

| 4,639,609 | A | * | 1/1987 | Floyd et al. ................. 307/10.1 |
| 5,416,702 | A | | 5/1995 | Kitagawa et al. |
| 5,845,221 | A | | 12/1998 | Hosokawa et al. |
| 6,127,741 | A | * | 10/2000 | Matsuda et al. ............... 307/36 |
| 6,624,529 | B2 | | 9/2003 | Obayashi |
| 6,700,386 | B2 | * | 3/2004 | Egami ........................ 324/503 |
| 6,921,987 | B2 | * | 7/2005 | Marin-Martinod ........... 307/32 |
| 6,986,398 | B2 | | 1/2006 | Obayashi |
| 2004/0232769 | A1 | * | 11/2004 | Pickering .................... 307/10.1 |
| 2004/0251743 | A1 | * | 12/2004 | Sadowski et al. ........... 307/10.1 |

FOREIGN PATENT DOCUMENTS

| JP | A 61-188252 | 8/1986 |
| JP | A-3-190534 | 8/1991 |
| JP | A-4-303041 | 10/1992 |
| JP | A-4-347536 | 12/1992 |
| JP | A 6-107089 | 4/1994 |
| JP | A 9-19055 | 1/1997 |
| JP | A-9-23589 | 1/1997 |
| JP | A-2002-199505 | 7/2002 |
| JP | A 2002-532320 | 10/2002 |

* cited by examiner

*Primary Examiner*—Anatoly Vortman
*Assistant Examiner*—Michael Rutland-Wallis
(74) *Attorney, Agent, or Firm*—Oliff & Berridge, PLC

(57) ABSTRACT

In an apparatus for driving and controlling plural on-vehicle electrical loads, an on-vehicle power supply generates power to be supplied the loads each having a priority. A power calculating device calculates a current available amount of the power to be supplied from the power supply, and a priority changing device changes one or more of the priorities on the basis of inputted information about a vehicle condition, the information including conditions of the loads. A command producing device produces a command value indicative of an amount of the power to be supplied to each of the loads by using the priorities. In this case, a sum of the power to be supplied to each load is kept within the available amount of the power to be supplied. A controller controls the power to be distributed to each of the loads on the basis of the command value.

35 Claims, 32 Drawing Sheets

| ID | LOAD NAME | PEAK LOAD | POWER AT PEAK Wpeak[W] | PEAK DURATION Tpeak[sec] | PRIORITY AT PEAK Ppeak |
|---|---|---|---|---|---|
| 1 | BLOWER | × | | | |
| 2 | SEAT HEATER | × | | | |
| 3 | LIGHT | ○ | 900 | 0.1 | 0.85 |
| | | | | | |

| NO. | FUNCTIONAL GROUP | ELECTRICAL LOAD |
|---|---|---|
| 1 | FULL-TIME OPERATION | ENGINE ECU, AT ECU... |
| 2 | RUNNING SYSTEM | INJECTOR, IGNITION DEVICE, TRANSMITTING SOLENOID... |
| 3 | COOLING/HEATING SYSTEM | AC BLOWER, CONDENSER FAN, HEATER... |
| 4 | LIGHTING/VIEWING SYSTEM | LIGHT, WIPER... |
| 5 | WARM-UP SYSTEM | ELECTRIC HEATING CATALYZER, DEFOGGER... |
| 6 | ACCESORY SYSTEM | AUDIO, NAVIGATION... |
| 7 | SECURITY SYSTEM | IMMOBILIZER... |

FIG. 31

METHOD AND APPARATUS FOR DRIVING AND CONTROLLING ON-VEHICLE LOADS

BACKGROUND OF THE INVENTION

1. Technical Field

The present invention relates to a method and apparatus for driving and controlling a plurality of electrical on-vehicle loads, and in particular to the method and apparatus that distributes electric power generated by an on-vehicle generator to the loads using pluralities given to the loads in advance.

2. Related Art

In recent years, the types of electrical loads (hereinafter, simply referred to as loads) mounted on vehicles, such as automobiles, and the total power consumption has been increased remarkably. It is supposed that this tendency will continue.

In addition, there is a tendency of employing a load drive system configured only by an electrical system without using mechanical components, as provided by a steer-by-wire system, which connects an operation device and an actuator. Such load drive system is very significant in that the system is directly concerned with some fundamental functions of the vehicle. Thus, the significance of stable supply of the power to the loads is growing.

When considering the current situations, however, problems attributable to vehicle mounting performance and manufacturing cost pose a limitation to an amount of power available from the power supplies, such as on-vehicle generator and batteries. Therefore, there is a possibility that a peak of power consumption that lasts only a short period of time exceeds temporarily a maximum capacity of the on-vehicle power equipment. This often results in a temporally shortage of power to be supplied to the loads, which may spoil comfortable driving conditions. Therefore, it has been desired to have a countermeasure against such a shortage in the power supply such that the power is supplied to significant electrical loads in charge of the fundamental functions of a vehicle (high-priority loads) in preference to other loads.

One of such countermeasures is provided by Japanese Patent Laid-open (KOKAI) publication No. 9-190055. This publication provides a technique that, when a sum of rated power of load in operation exceeds a predetermined allowable capacity, information about priorities previously given to the loads is read out. And based on the priorities, loads of which priories are lower are in turn subjected to a reduction in an amount of the supplied power or a shutdown of the power. Thus, the significant loads are given priority over the other loads.

However, the foregoing power-distributing technique proposed by the publication reference uses previously fixed priorities of loads. Thus, once a shortage of the power to be supplied is caused, loads given to lower priorities are obliged to have a lowered operation level or to accept the complete shutdown until the power supply is restored up to a sufficient level. Such a condition results in largely degraded amenity for crews.

In addition, a recent trend that the number of on-vehicle loads increases has been remarkable, with the result that the conventional technique of centrally controlling the priorities of loads is confronted with a difficulty. In other words, the number of on-vehicle loads and the capacities thereof should be changed due to for example vehicles' model changes. Whenever such an occasion arises, it should be necessary to re-adjust the priority order of the loads, thus resulting in an increased number of steps of development.

SUMMARY OF THE INVENTION

The present invention has been made with due consideration to the foregoing difficulty, and a first object of the present invention is to provide a method and apparatus for driving and controlling plural on-vehicle electrical loads, which are able to supply the electric power to the significant loads in a stable manner and to lessen the undesirable influence due to a lowered operation performance of the remaining loads other than the significant loads.

A second object of the present invention is to provide an apparatus for driving and controlling plural on-vehicle electrical loads, which is able to cope with an increase and decrease in the number of electrical loads mounted on a vehicle.

In order to accomplish the foregoing first object, as one aspect of the present invention, there is provided an apparatus for driving and controlling a plurality of on-vehicle electrical loads, comprising: an on-vehicle power supply configured to generate power to be supplied the loads to each of which a priority is given, the plurality of priorities being used for distributing the power to the loads; a power calculating device configured to calculate a current available amount of the power to be supplied from the power supply; a priority changing device configured to change one or more of the priorities on the basis of inputted information in relation to a vehicle condition, the information including conditions of the loads; a command producing device configured to produce a command value indicative of an amount of the power to be supplied to each of the loads by using the priorities, a sum of the power to be supplied to each load being kept within the available amount of the power to be supplied; and a controller configured to control the power to be distributed to each of the loads on the basis of the command value.

Hence, a priority given to each load and requested power (necessary power or minimum necessary power) can be adjusted depending on temporal changes in the vehicle conditions including conditions of the loads, so that the electric power is always distributed to the loads in an optimum fashion. Particularly, the electric power is distributed to the loads in a priority-descending order within an amount of the available power. In this power distribution, the priority given to each load is adjusted dynamically depending on vehicle conditions including the operating conditions of the loads, an optimum power distribution to well meet such current conditions can be performed.

For example, if some vehicle conditions are changed, the priorities of one or more load may be increased. If such an increase is performed, it is possible to eliminate or lessen the situation where the particular one or more loads are restricted in their functions or stopped for a long time, which is longer than the conventional. For instance, in the case of an electric motor requiring a large amount of power when it is started up, the priority of the motor is raised in response to a turn-on of the power to the motor. This allows the power to be supplied to the motor in preference to other loads, ensuring that the motor is started up steadily.

As another aspect of the present invention, there is provided an apparatus for driving and controlling a plurality of on-vehicle electrical loads, comprising: an on-vehicle power supply configured to generate power to be supplied to the loads to each of which a priority is given the plurality of priorities being used for distributing the power to the loads;

a power calculating device configured to calculate a current available amount of the power to be supplied from the power supply, a power-consumption calculating device calculating at least one of an amount of necessary power of each load and an amount of minimum necessary power of each load on the basis of information inputted in relation to a vehicle condition, the necessary power being defined as power consumption of each load on condition that the apparatus is in normal state in supplying the power to the load and the minimum necessary power being defined as power necessary for at the minimum a function of each load; a command calculating device calculating a command value indicative of an amount of the power to be supplied to each of the loads by using the priorities and the amount of at least one of the necessary power and the minimum necessary power, a sum of the power to be supplied to each load being kept within the available amount of the power to be supplied; and a controller configured to control the power to be distributed to each of the loads on the basis of the command value.

In this configuration, the electric power is distributed to the loads based on not only the priorities previously determined within an amount of the available power or determined on vehicle conditions (including load conditions) but also amounts of the necessary power and/or minimum necessary power of each load. Still preferably, a comparison between amounts of the necessary power and/or minimum necessary power and an amount of the available power is made to determine amounts of power to be distributed to the loads. Hence, an optimum power distribution well consistent with both the current conditions of a vehicle and the operating conditions of the loads can be performed.

By way of example, in cases where, residual power (an amount of the available power—a sum of amounts of minimum necessary power or a sum of amounts of necessary power) is short of being supplied to a certain high-priority load, because of its large amount of minimum necessary power, the power can be distributed to a low-priority load that is operable on the residual power, because of its lower minimum necessary power or necessary power. The power can therefore be utilized efficiently.

Still, as anther aspect of the present invention, there is provided a method for driving and controlling a plurality of on-vehicle electrical loads, comprising the steps of: generating power to be supplied the loads to each of which a priority is given, the plurality of priorities being used for distributing the power to the loads; calculating a current available amount of the power to be supplied from the power supply; changing one or more of the priorities on the basis of inputted information in relation to a vehicle condition, the information including conditions of the loads; producing a command value indicative of an amount of the power to be supplied to each of the loads by using the priorities, a sum of the power to be supplied to each load being kept within the available amount of the power to be supplied; and controlling the power to be distributed to each of the loads on the basis of the command value.

In order to accomplish the foregoing second object, the present invention provides an apparatus for driving and controlling a plurality of on-vehicle electrical loads, in which an on-vehicle power supply is provided to generate power to be supplied the loads to each of which a load priority is given, the load priority indicative of a priority order for supplying the power among the loads, the apparatus comprising: a power calculating device configured to calculate a current available amount of the power to be supplied from the power supply; a first calculating device configured to calculate an amount of first power to be supplied to each load group on the basis of a group priority indicative of a priority order for supplying the power among the load groups, each load group being any one of a plurality of groups obtained by dividing the plurality of loads, a sum of the first power to each load group being kept within the available amount of the power; a second calculating device configured to calculate an amount of second power to be supplied to each load belonging to any load group on the basis of the load priority, a sum of the second power to each load belonging to the load group being kept within the amount of the first power supplied to the load group; and a controller configured to control the power to be distributed to each of the loads on the basis of a power command value indicative of the amount of the first power to each load.

Accordingly, the above configuration distributes the power as follows. The electrical loads are divided into a plurality of groups each consisting of one or more loads. The available electrical power to be supplied from the power supply to the loads is first distributed to the load groups depending on group priorities previously given to the load groups, and then the power distributed to each group is distributed to the load(s) to belonging to each group depending on load priorities previously given to the load(s). Namely, the available power is supplied to the loads based on the two-stage priority-order distribution technique.

Hence when variations in vehicle types result in that the number of electrical loads is changed or amounts of power consumption of electrical loads is changed, it is enough to change the priority orders of loads only in a certain load group to which the changed load belongs, thus greatly reducing the number of steps necessary for the development of a vehicle. In addition, since the power is distributed by the two-stage priority-order distribution technique, it is able to easily cope with changes in the priorities.

The group priorities, that is, an order of the priorities among the load groups, can be fixed for the same type of vehicles, independently of an increase or a decrease in the loads. Thus, the same driving feeling can be given to crews during a period of time even when the vehicle's electrical loads are limited from being driven, as long as vehicles are different in variations but in the same type.

In the present invention, the normal state or normal operation of the load driving and controlling apparatus means that the apparatus is in operation without using the priority control technique according to the present invention.

BRIEF DESCRIPTION OF THE DRAWINGS

Other objects and aspects of the present invention will become apparent from the following description and embodiments with reference to the accompanying drawings in which:

FIG. 9A shows a table in which information about peak loads are stored load by load;

FIG. 9B is a timing chart showing a change in power consumption of a load that involves inrush current when the power is switched on;

FIG. 31 shows a table exemplifying electrical loads belonging to each of groups functionally categorized;

DETAILED DESCRIPTION OF PREFERRED EMBODIMENTS

Referring to the accompanying drawings, preferred embodiments of the present invention will now be described. The embodiments are reduced into practice in relation to an on-vehicle load driving and controlling system.

(First Embodiment)

An on-vehicle load driving and controlling system according to a first embodiment of the present invention will now be described.

Figure 1:
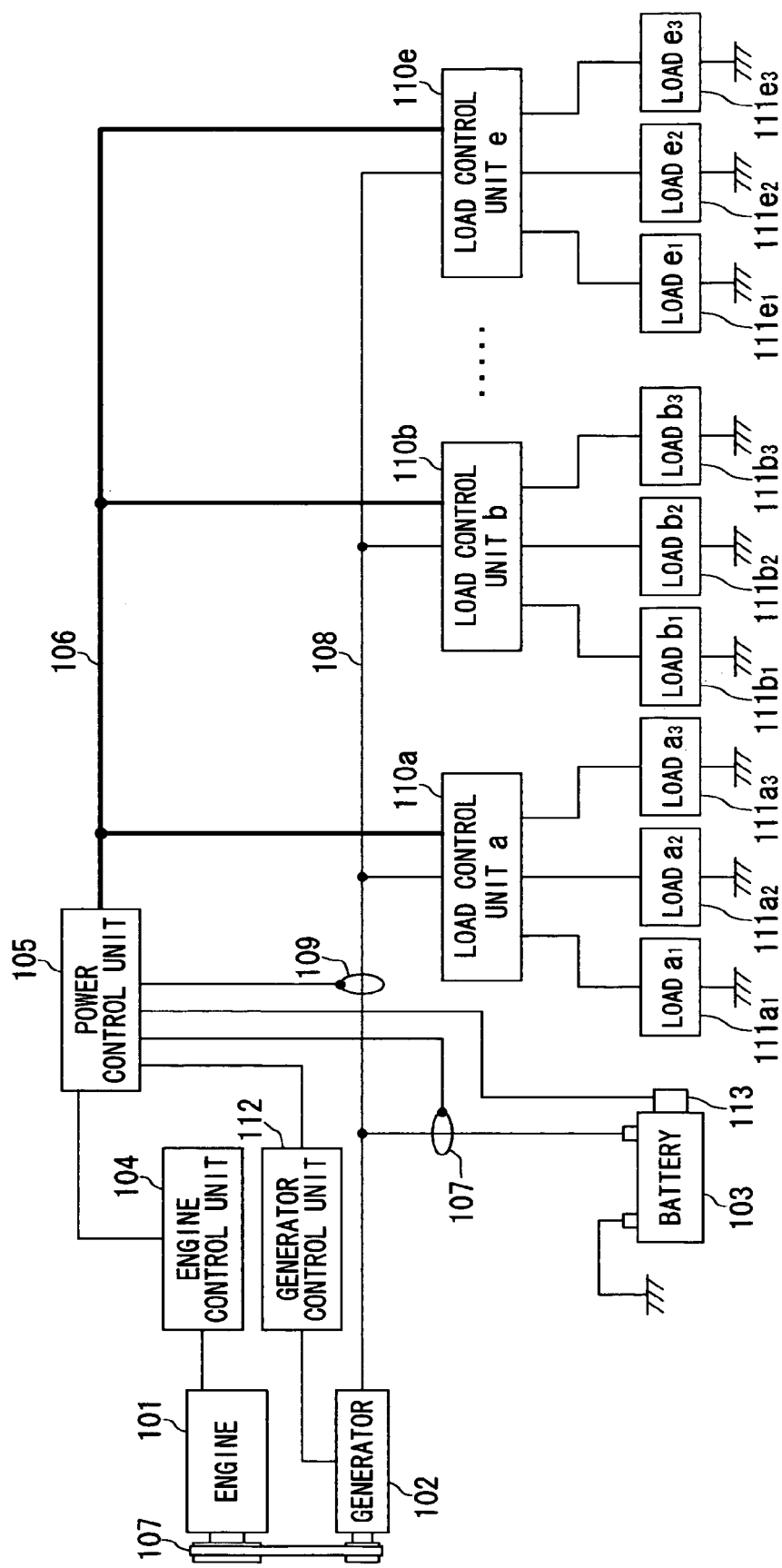
FIG. 1 is a block diagram showing a vehicle power supply system comprising an on-vehicle load driving and controlling apparatus according to a first embodiment of the present invention.

FIG. 1 is a block diagram showing a power supply system mounted on a vehicle, in which the power supply system is provided with the on-vehicle load driving and controlling system according to the first embodiment.

First of all, the configuration of the power supply system is provided with an engine 101, generator 102, battery 103, engine control unit 104, power control unit 105, load control units 110a to 110e, and generator control unit 112. The generator 102 is coupled with the engine 101 via a belt 107, and coupled with both of the battery 103 and the load control units 110a to 110e via a power supply line 108.

Each of the load control units 110a to 110e is in charge of controlling supply of power (electric power) to each group of loads 111a1 to 111a3 (to 111e1 to 111e3). Each of the load control units 110a to 110e is equipped with operation switches (not shown) and various sensors (not shown), which are necessary for the control of the power supply. Responsively to input signals from external devices and/or outputs from those sensors, each control unit 110a (to 110e) controls outputs and on/off operations to the loads of which control belongs to each control unit The engine control unit 104 is a device to control the engine 101 and electrically connected to the power control unit 105. This engine control unit 104 not only sends out, to the power control unit 105, information indicative of the number of engine rotations and others detected by sensors (not shown) for detecting amounts of various conditions of the engine 101 but also adjusts the output of the engine 101 depending on a command supplied from the power control unit 105.

The power control unit 105 monitors the conditions of various components including the generator 102, battery 103 and power supply line 108, and makes the generator control unit 112 control the generator 102. The power control unit 105, which is electrically connected with the generator control unit 112, sends out a command to the generator control unit 112 to make the unit 112 control an amount of power generated by the generator 102.

The generator control unit 112 sends, to the power control unit 105, generator-related information, such as an amount of power currently generated by the generator 102 and the number of current rotations of the generator 102. Sensors electrically connected with the power supply control circuit 105 include a battery current sensor 107, load current sensor 109, battery temperature sensor 113, and battery voltage sensor (not shown), with the result that input/output current to/from the battery 103, load current, battery temperature, and battery voltage are given to the power control unit 105. Further, the power control unit 105 is electrically coupled with the load control circuits 110a to 110e through a multiple signal transmission line 106 in such a manner that the unit 105 transmits and receives bits of information bi-directionally to and from the load control units 110a to 110e using a multiplex communication manner.

The functional configuration of the above on-vehicle power supply system shown in FIG. 1 will now be detailed in connection with FIG. 2.

Figure 2:
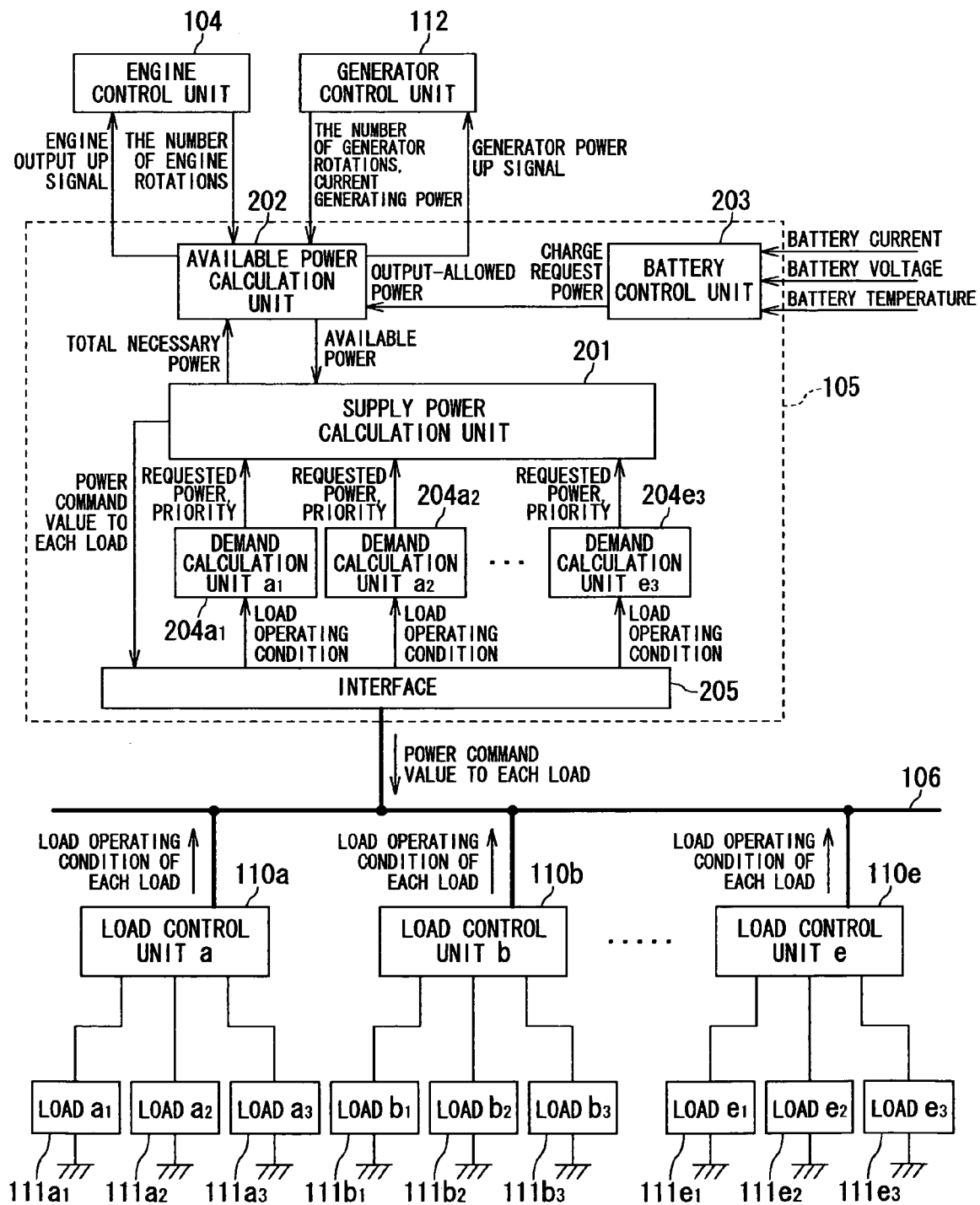
FIG. 2 is a bock diagram detailing the vehicle power supply system vehicle power supply system.

The power control unit 105 can be expressed in terms of its functions by blocks which are present in a range enclosed by a dotted line in FIG. 2. The functions of such blocks can be provided by a software or hardware configuration.

The power control unit 105 includes a supply power calculation unit 201, available power calculation unit 202, battery control portion 203, demand calculation units 204a1, 204a2, . . . , 204e3, and interface 205. Of these units, the available power calculation unit 202 receives, from the engine control unit 104, information indicative of both of the number of rotations and a load factor of the engine; from the generator control unit 112, information indicative of both of the number of rotations and a current generated power of the generator; and from the battery control unit 203, information indicative of both of amounts of output-allowed power and charge request power of the battery 103. And based on the received information, the available power calculation unit 202 calculates an amount of power that can be supplied to the loads, i.e., an amount of available power, and then sends out the calculated amount to the supply power calculation unit 201.

The available power calculation unit 202 receives information indicating an amount of total necessary power from the supply power calculation unit 201. Based on a relationship between the available power and the total necessary power, this unit 202 determines if an amount of generated power should be increased or not. If the determination shows that such an increase is necessary, the unit 202 gives the engine control unit 104 a command showing an amount to be increased of the engine output (i.e., an engine-output up amount) and gives the generator control unit 112 a command showing an amount to be increased of the power to be generated (i.e., a generation-amount increased amount), so that the output of the generator 102 is raised according to the commanded information.

The battery control unit 203 receives information indicative of battery input/output current, battery voltage, and battery temperature from a battery current sensor 107, battery voltage sensor (not shown), and battery temperature sensor 113, respectively. Considering those pieces of information, this unit 203 calculates amounts of both output-allowed power and charge request power of the battery 103, and supplies signals of the calculated amounts to the available power calculation unit 202.

The demand calculation units 204a1, 204a2, . . . , 204e3 are respectively prepared for the electrical loads 111a1, 111a2, . . . , 111e3, so that each unit copes with each load by calculating an amount of power that is demanded by each demand.

Each of the load control commands outputs, to the interface 205 via the multiple signal transmission line 106, parameters, such as switched states and operation modes of loads each connected to the power supply system, which are necessary for calculation of the requested power and a priority of power to be supplied. The interface 205 provides the demand calculation units 204a1, 204a2, . . . , 204e3 (corresponding to a priority and requested power outputting means) with data (i.e., parameters) indicative of operation conditions of the respective loads. Each of the demand calculation units 204a1, 204a2, . . . , 204e3 calculates both the priority and the requested power of each load in dependence upon the operational condition data (parameters) of each load, the calculated results being sent to the supply power calculation unit 201. The "requested power," though including information about necessary power and/or minimum necessary power of each load, will be detailed.

The supply power calculation unit 201 is in charge of calculating an amount of total requested power that is a sum of amounts of the requested power of each load obtained from the demand calculation units 204a1, 204a2, . . . , 204e3, and provides a calculated amount to the available power calculation unit 202. The supply power calculation unit 201 uses the information about both of the available power supplied from the available power calculation unit 202 and the priority and requested power of each load in order to calculate power to be supplied (i.e., supply power) to each load. This unit 201 then transmits the calculated results, as "power command values" to respective loads, to the respective load control units 110a to 110e via the interface 205 and multiple signal transmission line 106. Each of the load control units 110a to 110e accepts the power command value and controls power consumed by each load on the basis of the power command value.

Figure 3:
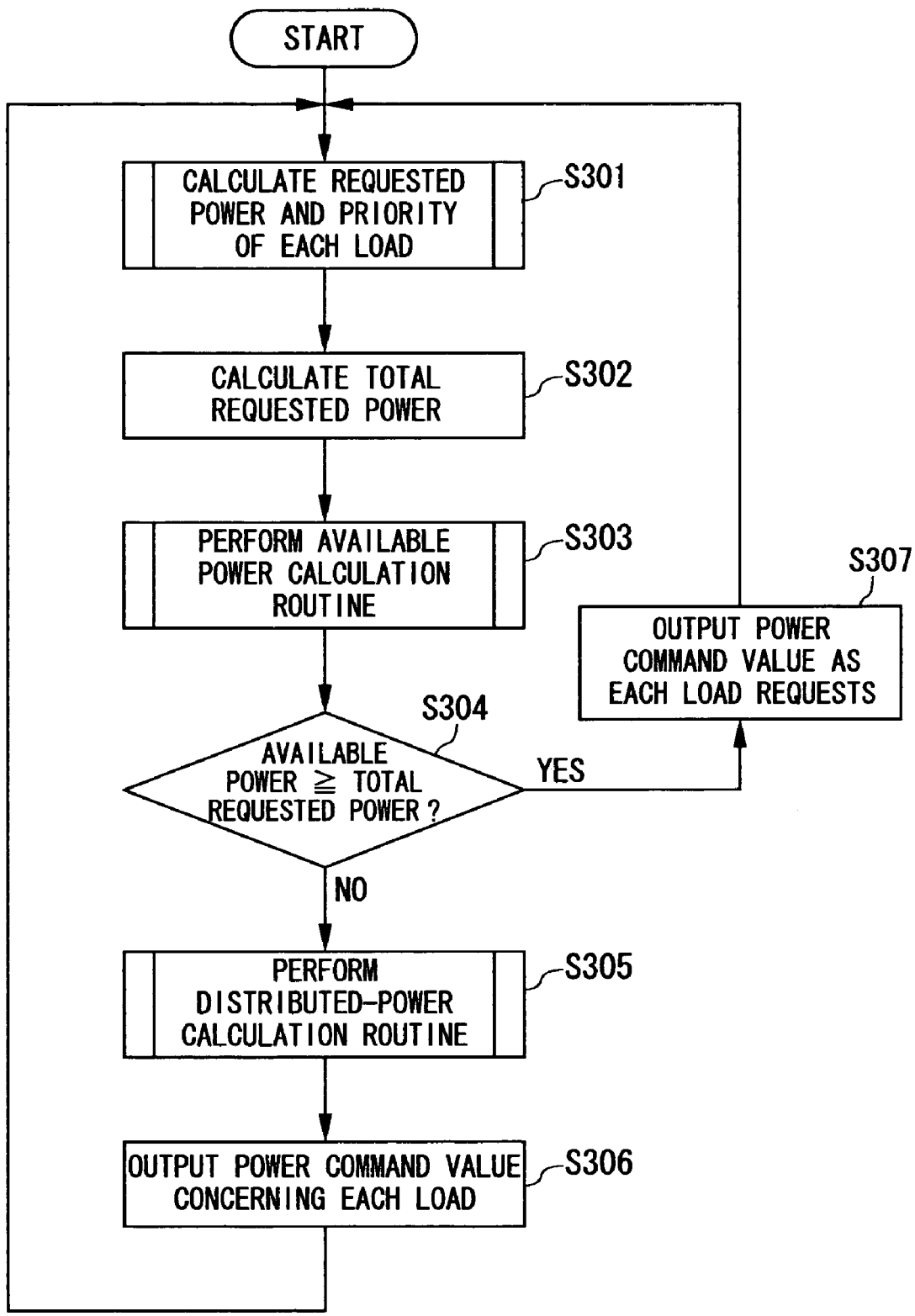
FIG. 3 shows a flowchart for functionally realizing a power control unit in FIG. 1.

Referring to FIG. 3, the operations of the power control unit 105 will now be described, which are carried out by each unit.

First, through a sub-routine process at step 301, each of the demand calculation units 204a1, 204a2, . . . , 204e3 calculates both of a priority and an amount of requested power of each load.

The "priority" given to each load is obtained based on a significance level inherent to the load and an operating condition of the load and an operation characteristic inherent to the load, so that the priority changes in real time. It is therefore usual that a calculation formula and coefficients of the calculation formula used in the subroutine carried out by each of the demand calculation units 204a1, 204a2, . . . , 204e3.

The "requested power" includes both of "necessary power" and "minimum necessary power." The necessary power can be defined as being power consumption necessary for assuring that each load functions in its normal state without having any limitation, whilst the minimum necessary power can be defined as being a minimum power necessary for securing minimum functions of each load. These necessary power and/or minimum power are treated as temporally-fluctuating parameters on the basis of an operating condition of each load and an operation characteristic inherent to each load. If the load is an on/off-operation type of load such as on-vehicle lamps, an amount of the necessary power equals that of the minimum necessary power. In contrast, if the load is composed of such an output-varying load as the blower fan of a car air-conditioner, the minimum necessary power is set to an amount of power consumed when minimum functions of the air-conditioner can be sustained, such minimum necessary power being smaller in the amount than the necessary power.

The processing in FIG. 3 is then made to proceed to step S302, where the subroutine processing provided by the supply power calculation unit 201 is executed to calculate an amount of total necessary power required by the entire vehicle. The total necessary power is a sum of necessary power calculated respectively by each of the demand calculating means 304a1, 203a2, . . . , 204e3.

The processing then goes to step S303, a supply power calculation routine composing in part a subroutine is executed by the available power calculation unit 202 in order to compute an amount of an available power to be supplied to each load. The supply-power calculation routine includes generated-power-amount changing processing which is carried using the amounts of both the total necessary power and the available power, which will be described later.

The processing is then performed at step S304, where a comparison is made between the amount of the total necessary power calculated by the supply power calculation unit 201 and the amount of the available power calculated by the available power calculation unit 202. When the comparison shows that the available power is equal to or larger than the total necessary power, the processing is made to proceed to step S307 that composes part of the subroutine executed by the supply power calculation unit 201. At step S307, commands serving as "power command values" calculated by the demand calculation units 204a1, 204a2, . . . , 204e3 are outputted, as they are, to the load control units 110a, 110b, . . . , 110e respectively controlling the loads 111a1, 111a2, . . . , 111e3, before returning to step S301.

In contrast, when the comparison shows that the available power is less than the total necessary power, the processing is made to proceed to step S305 that composes part of the subroutine executed by the supply power calculation unit 201. At step S305, based on both of the commanded power and priority of each load, amounts of power distributed to the respective loads are calculated so that a total of distributed power amounts to each load do not exceed the available power. At step S306, the calculated amounts to distribute the power to the respective loads are outputted as "power command values" to the load control units 110a, 110b, . . . , 110e, before returning to step S301.

The above operation provides an optimum power distributing control in real time, where the electric power is securely supplied to essential loads in relation to vehicle's fundamental functions. This power supply can be established by limiting power supply to loads of which priorities are lower in cases where the sum of power required by the respective loads is over the available power of the power supply apparatus, with the total power consumption kept any time within the available power.

(Subroutine for Calculating Available Power)

Figure 4:
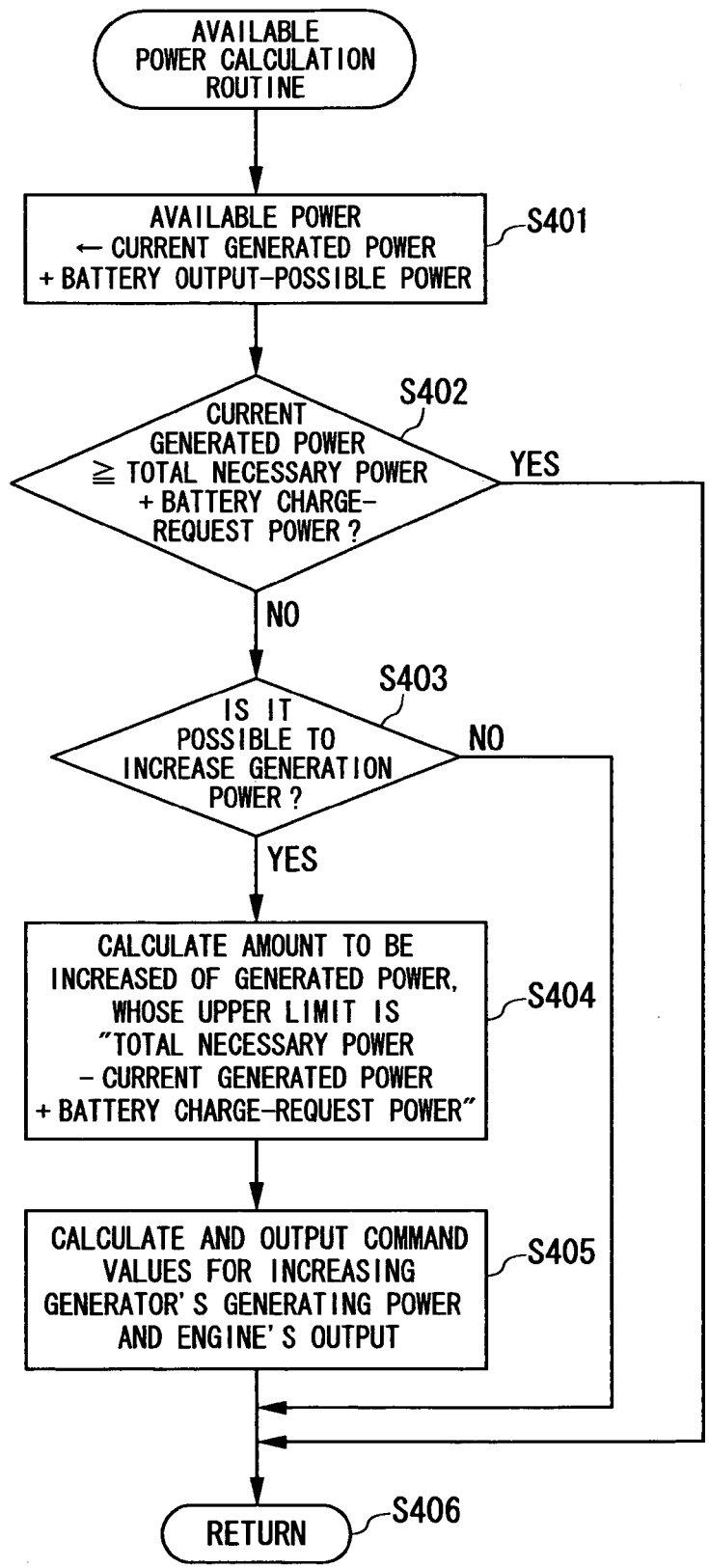
FIG. 4 shows a flowchart for functionally realizing an available power calculation block in FIG. 3.

The subroutine for calculating available power, which is executed by the available power calculation unit 202 shown at step S303, will now be explained with reference to FIG. 4.

First, at step S401, calculated is the sum of an amount of current generated power calculated by the generator control unit 112 and an amount of power available from the battery 103, that is, battery output-allowed power calculated by the battery control unit 203. The calculated sum of power is treated as being available power.

The processing then proceeds to step S402, where calculated is the sum of the total requested power (i.e., total necessary power) calculated at step S302 and the battery charge request power calculated by the battery control unit 203. The calculate sum of power is compared with the current generation power, and if the calculated sum is greater than the current generation power, the processing is made to proceed to step S403.

The processing is then executed at step S403, where pieces of information about the current generation power, the number of engine rotations, and others are used to determine whether or not an increase in the power is possible. The determination shows if such an increase is impossible, the processing is made to skip to step S406 to return to the main routine. By contrast, when it has been determined at step S403 that such an increase in the power is possible, the processing goes to step S404, at which an amount to be increased of generated power is obtained within an allowable range of generation power, whose upper limit is defined as being a maximum-power-increase necessary amount=total necessary power−(current generated power+battery charge request power). This generation-power increase amount is decided by the capacity of the generator and an output-increase possible amount of the engine that serves as a torque supply source to the generator.

Then, the processing is executed at step S405, where on the basis of the amount to be increased of generated power calculated at step S404, a generated-power increase command value and an output increase command value are calculated, and outputted to the generator control unit 112 and the engine control unit 104, respectively. The generator control unit 112 and the engine control unit 104 use those commands to control the generator 102 and the engine 101, respectively.

By the way, the determination at step S402 reveals that the sum of the total necessary power and the battery charge request power is equal to or less than the current generated power, the processing is also made to skip to step S406 to return to the main routine.

(Subroutine for Calculating Power to be Distributed to Each Load)

Referring to a flowchart shown in FIG. 5, a subroutine for calculating power to be distributed to each load will now be described, the subroutine being executed at step S305.

First of all, at step S501, on the basis of the priority given to each load, which has been calculated by each of the demand calculation units 204a1, 204a2, . . . , 204e3, the loads are ranked in the descending order of the priorities. In the present embodiment, the total number of the loads is handled as "n."

The processing is then carried out at step S502, where the amount of the available power calculated by the available power calculation unit 202 is substituted into an amount indicative of a residual power Pleft that is a variable, and at step S503, an index variable "i" for the priorities is reset to 1.

The processing is further carried out at step S504 to determine if the power necessary of a load of which priority is "i-th" is equal to or smaller than the residual power Pleft. If determined that the power necessary for the specific load is equal to or smaller than the residual power Pleft (YES at step S504), a power command value to the load having the i-th priority is set to a value that is equal to the necessary power of the load having the i-th priority. The thus-set power command value is given to a load control unit controlling the load. Then the processing proceeds to step S506, at which the foregoing power command value is subtracted from the residual power Pleft, before going to step S507.

In cases where it has been determined at step S504 that the power necessary of the load having the i-th priority is larger than the residual power Pleft (No at step S504), the processing at step S509 is then carried out At step S509, it is further determined whether the minimum necessary power of the load having the i-th priority is over the residual power Pleft. If this determination is YES (that is, the minimum necessary power is over the residual power Pleft), the processing goes to step S517, where the power command value to the load of the priority "i-th" is given as "zero" and outputted. As a result, a load to which the power command value of "zero" is outputted is turned off, before the processing proceeding to step S507.

If it has been determined at step S509 that the minimum necessary power of the load having the i-th priority is equal to or less than the residual power Pleft, the processing is shifted to step S510. At step S510, whether or not the number of operation modes of the load of the i-th priority is zero is determined.

In the present embodiment, the number of operation modes shows an amount of power consumed by each load. When the power consumed by a load changes in a discrete manner, without being changed continuously, the number of operation modes is plural. When the number of operation modes is two or more, this means that the operation modes are also two or more and the same in number. The memory range of the supply power calculation unit 201 includes a table shown in FIG. 6, in which power amounts consumed in each operation mode are listed load by load.

In the present embodiment, the operation modes are denoted as being operation modes 1, 2, . . . in the descending order of the power consumption amounts. A load whose mode is simply switched on/off and a load whose power consumption changes continuously are determined that the number of operation modes is zero, thus having no operation mode.

When the determination at step S510 shows that the number of operation modes of the load having the i-th priority is zero, the processing is shifted to step S511, where a power command value to the corresponding load is set to the amount of the current residual power Pleft, before shifting to step S506.

In contrast, when the determination at step S510 shows that the number of operation modes of the load having the i-th priority is not zero, the processing is shifted to step S512, where an index variable "j" concerning the operation modes is set to 1, and then shifted to the determination at step S513. At step S513, it is further determined whether or not the amount of memorized power consumed by the corresponding load under the operation mode "j" is equal to or less than the residual power Pleft.

If the determination at step S510 is affirmative, that is, the power amount is equal to or less than the residual power Pleft, the processing is made to proceed to step S514, where a power command value to be directed to the corresponding load of the i-th priority is decided by reading from the memory an amount of power consumption matching with the index variable "j" of the operation modes. The decided power command value is then outputted, and then the processing is shifted to step S506. However, the determination at step S510 is negative, namely, the power amount is larger than the residual power Pleft, the processing is made to proceed to step S516. At step S516, it is further determined if the index variable "j" is equal to the number of operation modes. As a result of it, if the equality is not realized at step S514 (NO), the processing is made to go to step S515 to increment the variable "j" up to j+1, before being returned to step S513 to determine the next operation mode.

On the contrary, when the determination at step S516 shows that the index variable "j" is equal to the number of operation modes previously memorized (that is, the condition shown at step S513 has not been met for all the operation modes: YES at step 3516), the processing is made to go to step S517. At this step S507, the power command value directed to the load having the i-th priority is set to zero, before returning to step S507.

At step S507, it is determined if the index variable "i" concerning with the priorities has reached the number "n" of loads. If the variable "i" has a value other than the number "n," the variable "i" is incremented (i=i+1) at step S508, before the processing is returned to step S504. On completing the decision of all the power command values (practically, "i"="n" at step S517), the processing is returned to the main routine through the return processing at step S518.

The foregoing subroutine processing enables the power to be distributed to the loads in the descending order of the priorities given to the loads. In this power distribution, if a certain load has a priority relatively higher than others but is too power-consuming to have the sufficient amount of power for driving the load, the residual power is supplied to a load having a relatively lower priority but consuming a less amount of power. It is therefore possible to lessen the number of loads of which functions are limited, while still allowing the significant loads to have their function as many as possible.

(How to Calculate Priorities and Amount of Requested Power)

How to calculate the priorities and the amounts of requested power, which is carried out by each of the demand calculation units 204e1, 204e2, . . . , 204e3, will now be described.

Figures 6, 7:
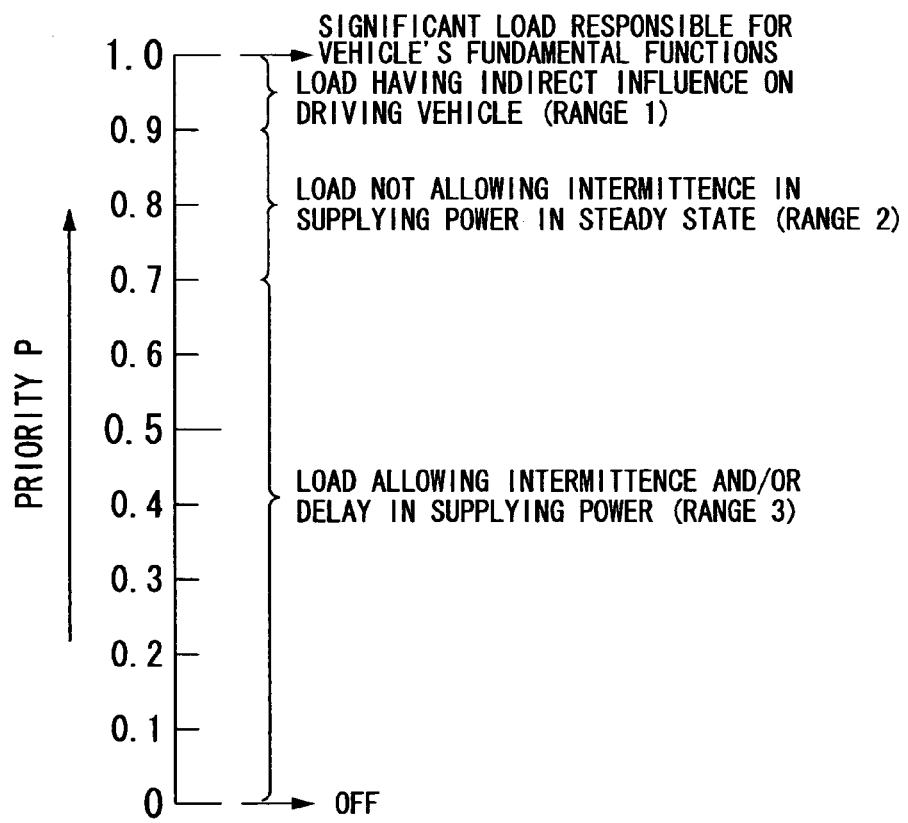
FIG. 6 shows a table in which amounts of power consumption are load by load listed under each operation mode.
FIG. 7 shows the definition of a priority.

The definition of the priority "P" according to the embodiment is illustrated in FIG. 7. The priority "P" is defined as a value ranging from 0 (zero) to 1.0. A priority of 0 indicates that the power is an off state. In contrast, a priority of 1 is a special priority, which is given to only significant loads, such as power steering apparatus, which are responsible for the fundamental functions of a vehicle. The necessary power is always supplied to the loads without any limitations, if their priorities are 1.

The priority "P" has a range of 0 to 1, which is sectioned into three ranges 1 to 3. The range 1 of $0.9 \leq P < 1.0$ is assigned to loads, such as lighting devices and wipers, which have indirect influence on driving a vehicle. The range 2 of $0.7 \leq P < 0.9$ is assigned to loads whose on/off switchovers are prohibited under their normal operations (that is, the operations carried out under the normal state of the apparatus).

In the present embodiment, the "normal state or normal operation" of the power supply system means that the system is in operation without making use of the priority changing technique according to the present invention.

For example, the loads to be assigned to the range 2 include dashboard lighting devices of which functions are subjected to direct influence, if the power is interrupted. In the ranges 1 and 2, to avoid intermittent operations of each load placed under its power-limited state, the relationships of magnitudes of the priorities given to the loads are decided not to change as time goes on. The range 3 of $0 < P < 0.7$ is assigned to loads, such as air conditioner and heater, to which intermittent supply of the power and/or delay of power to be supplied are allowed. In the case of this range 3, the priority given to each load changes as time goes on depending on driven conditions of the load, environmental conditions, and others, thus the relationships of magnitudes of the priorities being changed at any time. The changes in the priority magnitudes prevent only particular loads to stop their operations for a long time.

(Subroutine for Calculating Priorities)

Referring to a flowchart shown in FIG. 8, a subroutine for calculating a priority will now be explained, which is part of the subroutine executed by each of the demand calculation units 204a1, 204a3, . . . , 204e3 at step S301.

Firstly, at step S801, it is determined if each load relating to each of the demand calculation units 204a1, 204a3, . . . , 204e3 is a load exhibiting a peak of power consumption when the power thereto is switched on (hereinafter, such a load is referred to as "peak load").

Figures 9A, 9B:
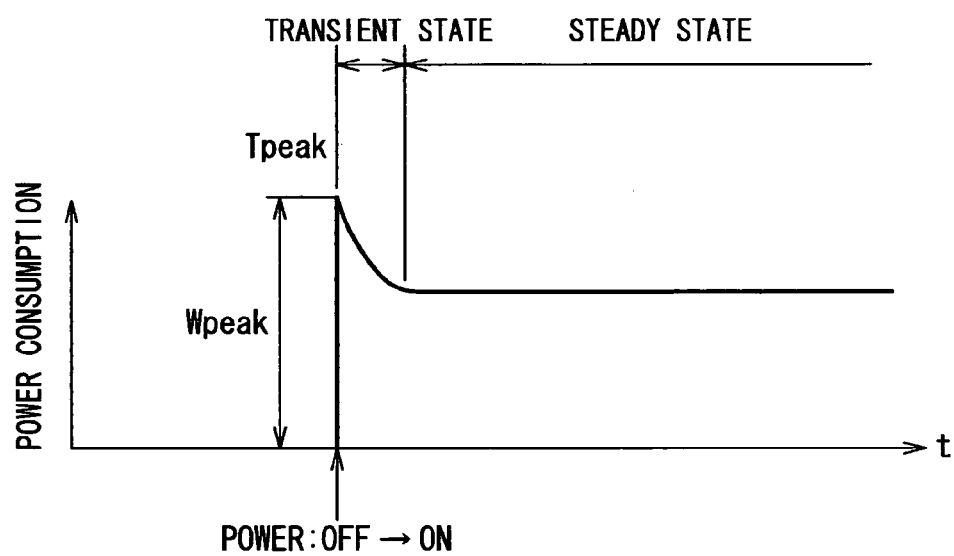

Of the on-vehicle electrical loads, there are some loads, such as motor and lighting devices, which cause a large quantity of inrush current, as shown in FIG. 9B, when switching from a power-off state to a power-on state. For each of the peak loads, as listed in part in a table shown in FIG. 9A, various necessary parameters are previously defined, the parameters including an amount Wpeak of peak power, a duration Tpeak of the peak power, and a priority Ppeak of each load when the peak power appears. The parameters are memorized in memory areas of the demand calculation units 204a1, 204a3, . . . , 204e3 and used by the determination executed at step S801.

If it has been determined at step S801 that the load subjected to this time of determination is a peak load (YES), the processing is shifted to step S803, while if the determination at step S801 shows a negative result (NO), the processing is executed at step S802.

At step S803, it is further determined whether or not the current timing is after the power to this peak load has just switched from its off state to its on state, but is still within a period of duration Tpeak of the peak load. If determined such that the timing is still within the duration Tpeak, it can be recognized that the peak load has been obliged to have a power consumption peak, because the electric power has switched on. Then the processing is returned to step S804 to designate the priority Ppeak as being a priority of the load. The priority Ppeak is set to a relatively larger value than that in its normal operation, thereby being set to a priority belonging to either the range 1 or 2. The reason is as follows. By giving a higher priority to the load for the start, the available power can be given to each peak load in preference to others, only when the loads are started. Accordingly, when the peak loads are started, the electric power to be supplied to the peak loads is secured as much as possible, which leads to smooth transitions of the peak loads to their steady states.

In contrast, it has been determined at step S803 that the current time is after the power to this peak load has switched from its off state to its on state and after the period of duration Tpeak of the peak load, consideration can be made such that the peak load is in a steady state. In this case, the processing is made to go to step S802.

At step S802, depending on the characteristics of each load and in compliance with operating conditions and environmental conditions, a priority to be given to each load which is under the normal operation (that is, the operation carried out in the normal state of the power supply system) is calculated. This step can be conducted in various ways depending on the characteristics of each load.

One example will be explained with reference to FIGS. 10 to 12.

Figure 10:
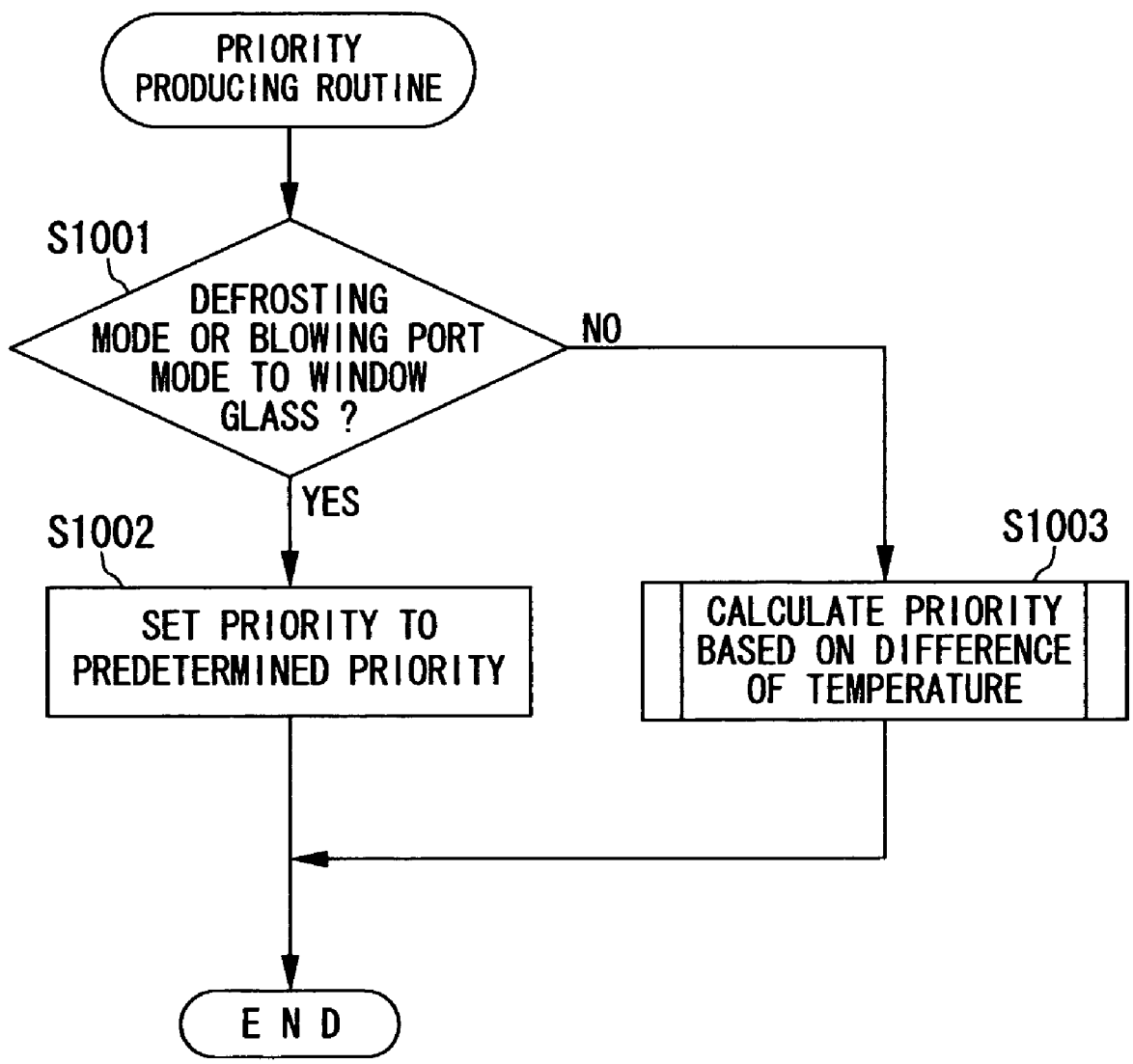
FIG. 10 is a flowchart showing how to produce a priority to be given to a blower fan of an air conditioner.
Figure 11A:
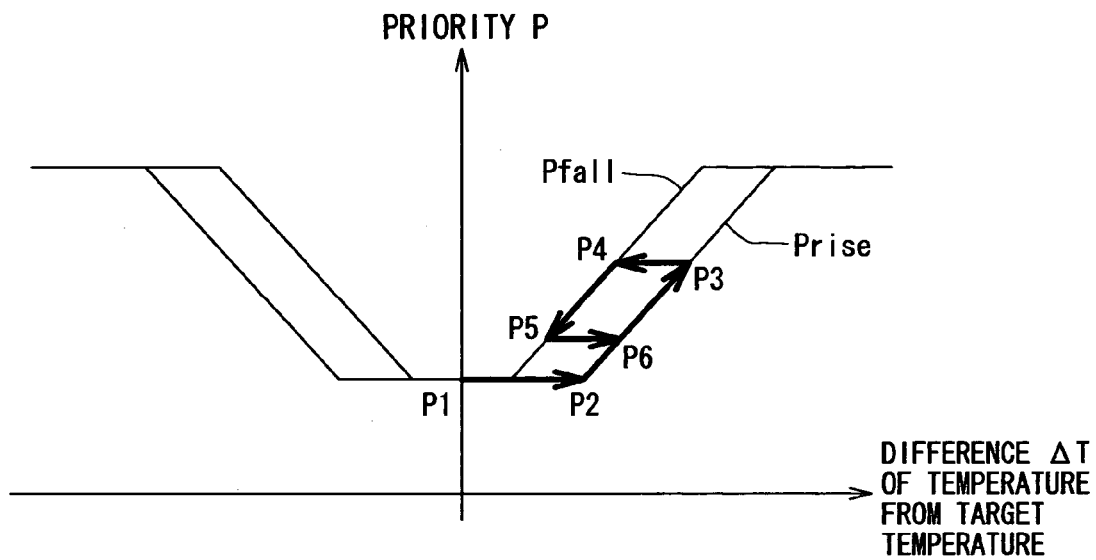
FIG. 11A is a graph explaining how to produce the priority to be given to the blower fan of an air conditioner, the graph focusing on a relationship between a temperature difference ΔT and a priority P.

FIG. 10 is a flowchart that exemplifies how to produce a priority of a blower of an on-vehicle air conditioner.

At step S1001, it is determined whether the operation of the air conditioner is in a defrosting mode (i.e., a mode to direct the blowing direction) or a blowing port mode is directed to the window glass. If the determination at step S1001 is YES, the processing is made to go to step S1002, where the priority of the blower is obliged to be set to a value higher than that in the normal operation.

In contrast, the determination at step S1001 is NO, the processing is executed at step S1003 to decide the priority of the blower, as described later. This makes it possible that, whenever defrost is required by the air conditioner, the priority of the air conditioner is always raised. Hence, a reduction in the defrosting function, which results from a lowered priority of the blower of the air conditioner on account of the conventional priority control, can be avoided, whereby a problem that the frost on the window glass has an undesirable effect on a driver's view can be prevented in a steady manner.

Referring to FIG. 11, the priority calculation for the blower of the air conditioner, which is carried out at step S1003, will now be exemplified.

Figure 11B:
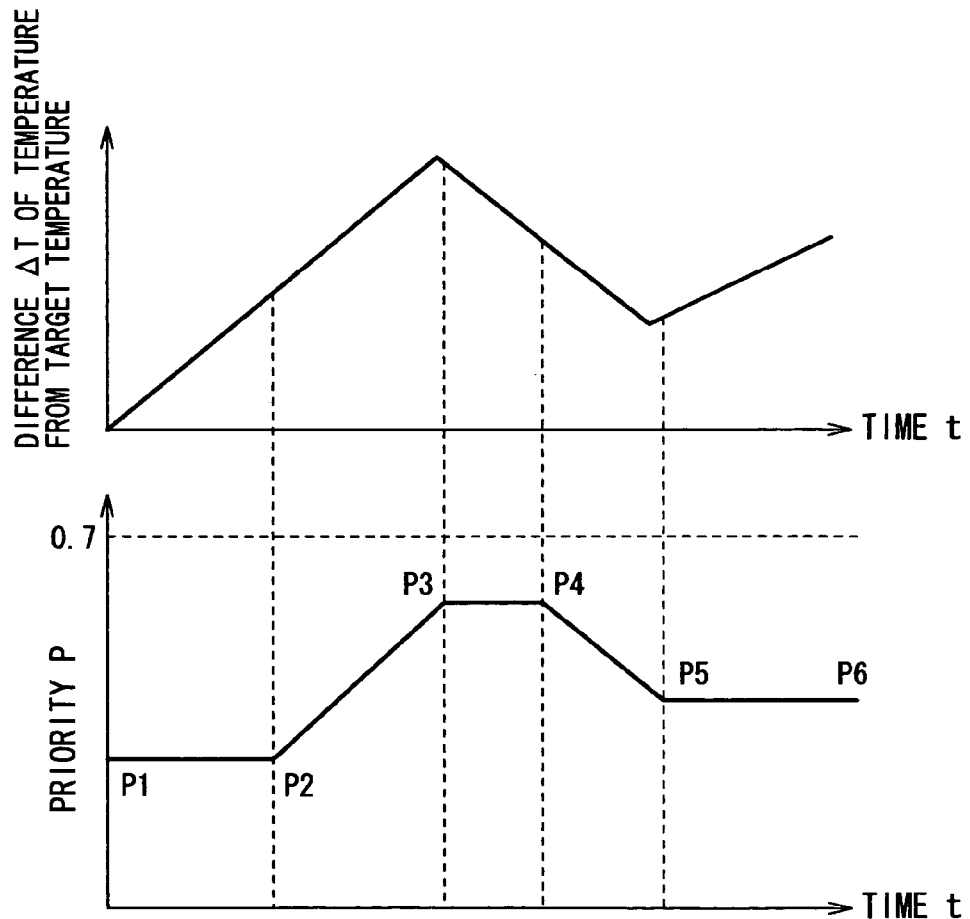
FIG. 11B shows graphs explaining how to produce the priority to be given to the blower fan of an air conditioner, the graphs focusing on periodic synchronous changes between a temperature difference ΔT and a priority P.

The demand calculation unit in charge of handling this blower carries out the demand calculation subroutine, where the unit receives signals indicative of both of a target temperature designated on an air-conditioner operation panel (not shown) and an actually measured temperature measured by an in-car temperature sensor through the multiple signal transmission line 106. Based on the received signals, a temperature difference ΔT showing a difference from the target temperature is calculated The temperature difference ΔT is applied to a map shown in FIG. 11A to decide a priority P. In the map, as shown therein, there are provided data indicative of two curves Prise and Pfall; one curve Prise is used when increasing the absolute value of the temperature difference ΔT, while the remaining curve Pfall is use when decreasing the absolute value of the temperature difference ΔT. Namely, as shown in FIG. 11B, the priority changes with a hysteresis characteristic, while the temperature difference ΔT increases and decreases. Points P1 to P6 shown in FIG. 11A correspond to operation points P1 to P6 shown in FIG. 11B, respectively. For increasing and decreasing the priority, the hysteresis characteristic prevents the occurrence of hunting in the priorities which are attributable to slight changes in temperature.

In this way, the priority is increased as the difference from the target temperature becomes large, so that the priority is set to lower values, when the actual temperature is closer to the target temperature and there is less necessity for driving the load (i.e., blower). As a result, in cases where the available power is short as a whole, the power to be supplied to the other loads can be increased instead.

The similar calculation technique of a priority can be applied to a load that has some target value concerning its operations and allow a difference from the target value to be generated. Although the above example is explained about calculating the priority for the single parameter "in-car temperature," an alternative calculation technique is still possible. For example, an evaluation function is calculated based on a plurality of parameters and the evaluation function is used to compute a priority.

Figure 12:
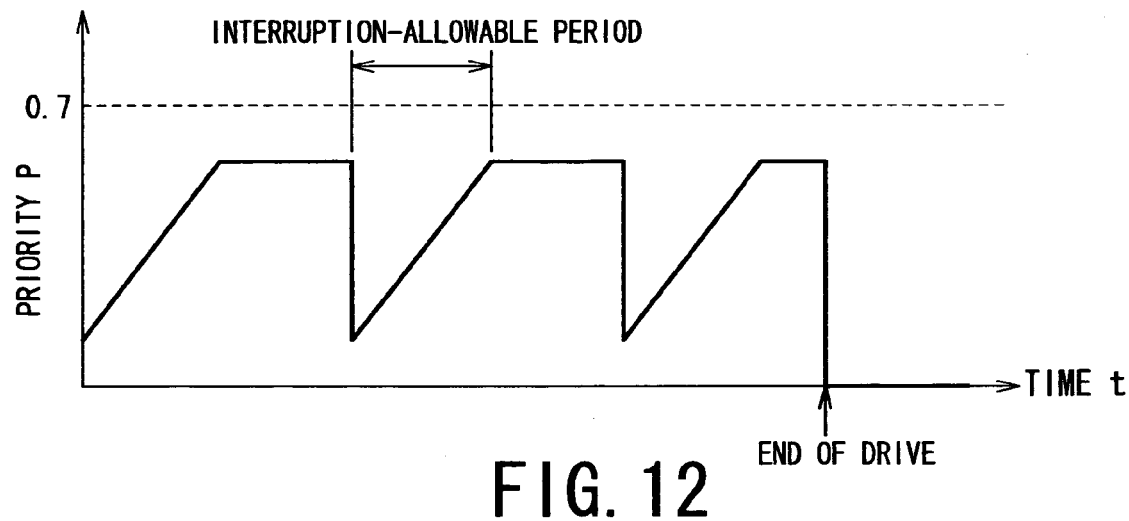
FIG. 12 is a timing chart exemplifying how to calculate a priority to be given to a defogger.

FIG. 12 shows an example of how to calculate a priority for a defogger.

The demand calculation unit (i.e., the demand calculation subroutine) for this load produces a priority that changes periodically within the priority range 3, as shown in FIG. 12. As shown in FIG. 12, this periodically changing characteristic of the priority includes periods of time (referred to as "interruption-allowable periods"), each of which lasts for a given period of time with lower priorities. During each of those "interruption-allowable periods," the power can be supplied to the other loads assigned to the priority range 3. In other words, a situation in which such a load of which priority changes periodically occupies the electric power for a long time can be prevented. The same technique for controlling the priority by using the interruption-allowable periods can be applied well to other loads, such as heater, that will not lose its functions immediately even if the power supplied thereto is shut off (i.e., the power can be interrupted).

Figure 13A:
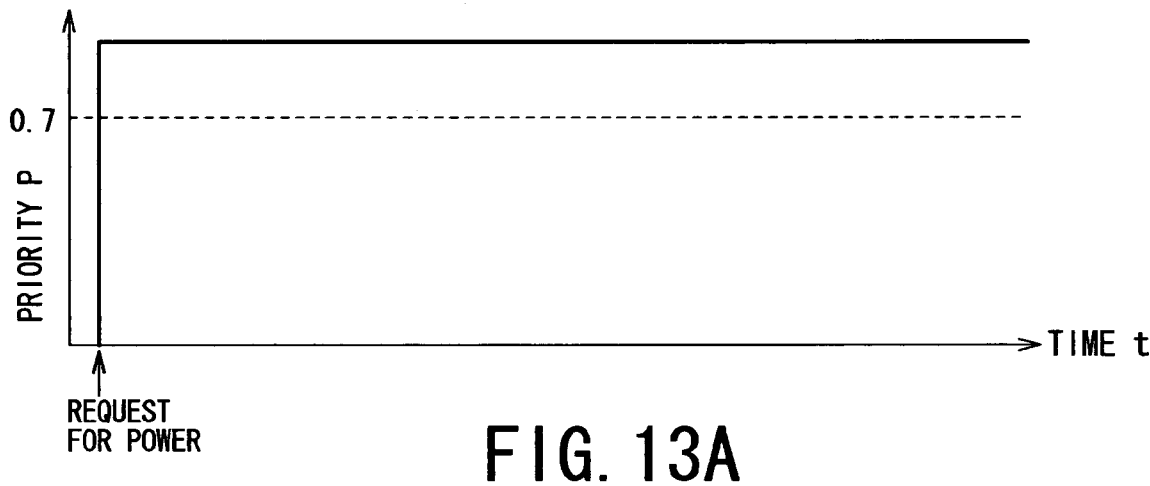
FIG. 13A shows a change in a priority given to a load that does not allow a delay for a period of time from a request for the power (power: on) to a start in supplying the power.
Figure 13B:
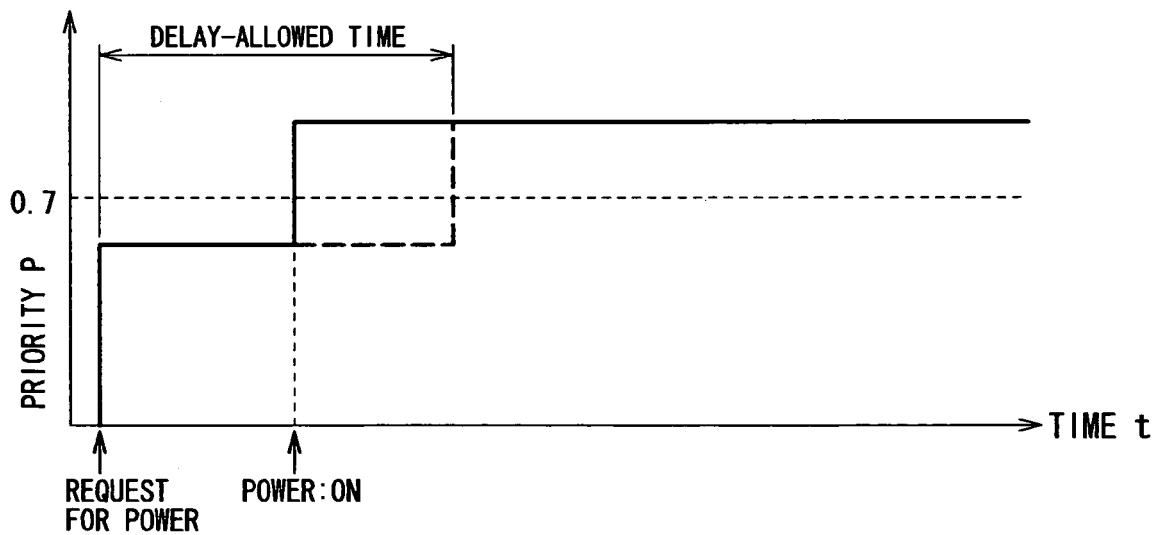
FIG. 13B shows a change in a priority given to a load that allows a delay for a period of time from a request for the power (power: on) to a start in supplying the power.

FIGS. 13A and 13B exemplify how to calculate a priority for loads whose interruptions of the power thereto cannot be permitted, such loads including lighting devices for meters on the dashboard.

FIG. 13A exemplifies a priority given to a load that does not allow a delay from a request for the power to the actual start of supplying the power to the load. As shown in FIG. 13A, simultaneously with detection of the request of the power using a signal from a power switch or others, the priority of the load is raised from a value in the priority range 1 to the priority range 2, and then a constant value of the priority is kept. As described above, the magnitude relationships of priorities of loads belonging to the ranges 1 and 2 is unchanged when the time elapses. If a shortage of available power occurs against such loads of which priorities belonging to the ranges 1 and 2, the power is shut off in turn in the ascending order from a load whose priority is lowest. Once a load experienced a shutoff of the power does not become a state to receive the power until the power is able to be supplied again, thus avoiding useless interruptions of the power.

Meanwhile, FIG. 13B exemplifies the priority given to a load that allows a delay from a request for the power to the actual start of supplying the power to the load. When a request for the power to such load is detected, the demand calculation unit reads out a given priority in the priority range 3 and outputs information about the read-out priority. Since the magnitude relationships among priorities within the priority range 3 is changed without rest, resulting in that, in cases where the available power is less than the entire necessary power, there may occur a situation in which the power cannot be supplied immediately owing to a magnitude relationship among the priorities of other loads belonging to the priority range 3.

In such a case, subsequent temporal changes in the priority of each load may cause the priorities of such other loads belonging to the priority range 3 to be raised. If such a rise is realized, the power to the other loads is allowed, whereby the power is supplied to the load. Simultaneously with the start of this power, a priority and demand power generation unit operates such that the priority is changed to a given value in either the priority range 1 or 2 (refer to a solid line in FIG. 13B). The priority to be given to this load afterward is the same as that shown in FIG. 13A.

In cases where the request for the power was detected but the power is not allowed to be supplied even after a predetermined period of time has passed after the detection, the priority is adjusted to a given value within either the priority range 1 or 2. The predetermined period of time is a maximum time counted from the request for the power and treated as an allowed delay by each load. This allowed delay time is memorized in advance.

Hence, when the available power is over the total necessary power and the power to be supplied is short, the above operations are able to delay the power to be supplied to a load that accepts a delay of power only when the power begins to be supplied again. It is therefore possible to avoid the power of loads from concentrating temporally, thus suppressing a short-term shortage of the power.

(Subroutine for Calculating Requested Power)

Figure 14:
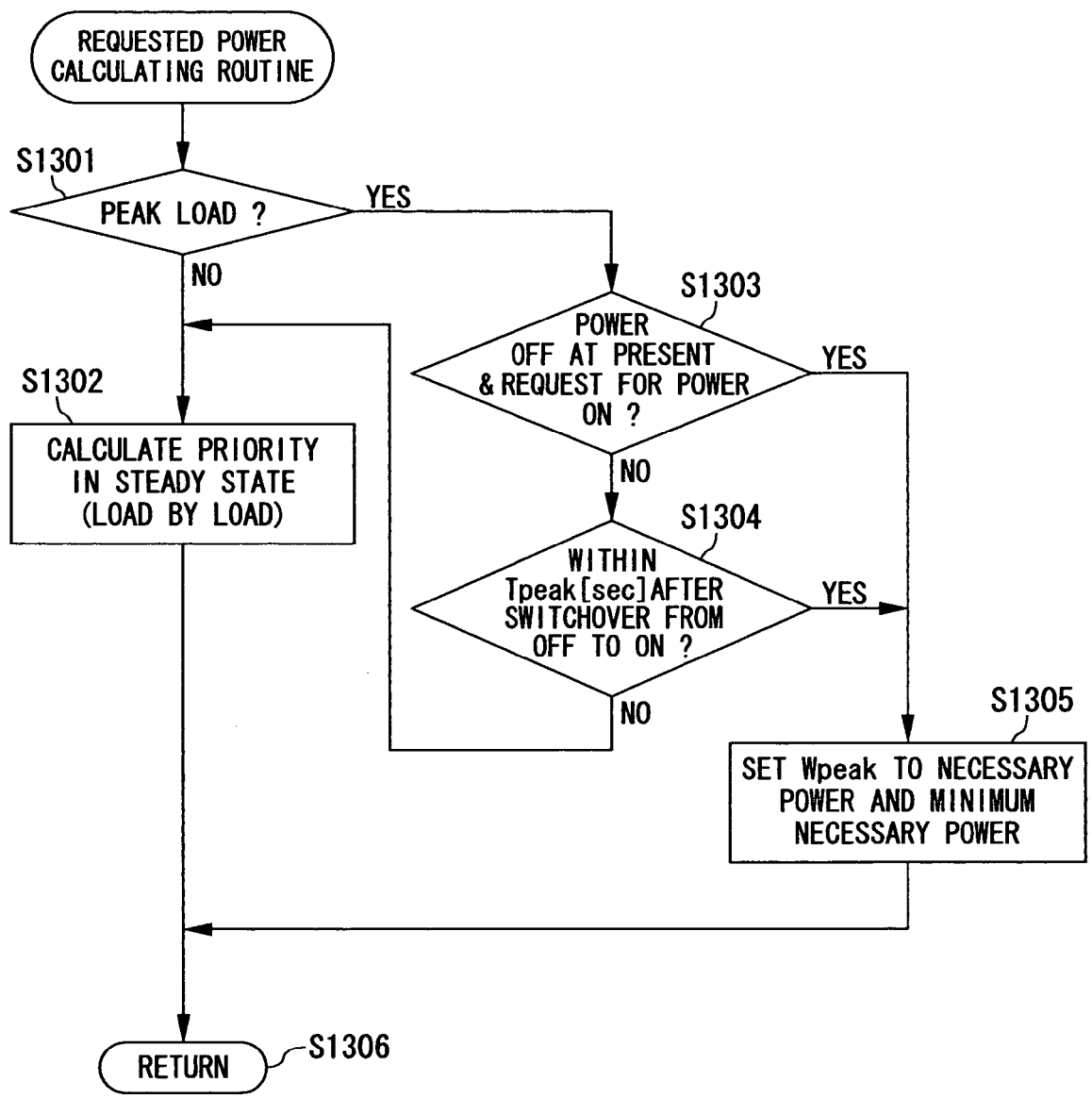
FIG. 14 is a flowchart showing a subroutine for calculating requested power, which composes part of a demand calculation unit.

Referring to a flowchart shown in FIG. 14, a subroutine for calculating requested power will now be explained, the subroutine corresponding in part to each of the demand calculation units 204a1, 204a2, . . . , 204e3.

First, it is determined at step S1301 if a load to be determined is the foregoing peak load. When it has been determined that the load is the peak load, the determination is made at step S1303 whether or not the power is off at present and a request for the power has been issued. If the determination is NO at step S1303, the processing is made to proceed to step S1304, where it is further determined whether or not the power is off at present and the current time is within the time Tpeak.

In cases where the determination at both steps S1303 and S1304 is YES, step S1305 is then subjected to the processing. That is, amounts of the necessary power and the minimum necessary power are set to Weak, returning to the main routine through step S1306. The other determined results at both steps cause the processing to go to step S1302, where predetermined amounts of both necessary power and minimum necessary power are calculated as values of requested power in the normal operation, depending on driving conditions of the load to be determined. The processing is then returned to the main routine through step S1306.

The reason why values of the necessary power and minimum necessary power are set to Wpeak is as follows. The foregoing peak load needs, at a time when the power is turned on, a larger amount of power than that in the steady state of the power. Hence, the necessary power and the minimum necessary power, which are necessary before the turn-on of the power and at a time when the power is turned on (i.e., a transient state) as shown in FIG. 9B, are set to the peak power Wpeak, so that the power for starting the load can be secured.

Figure 15:
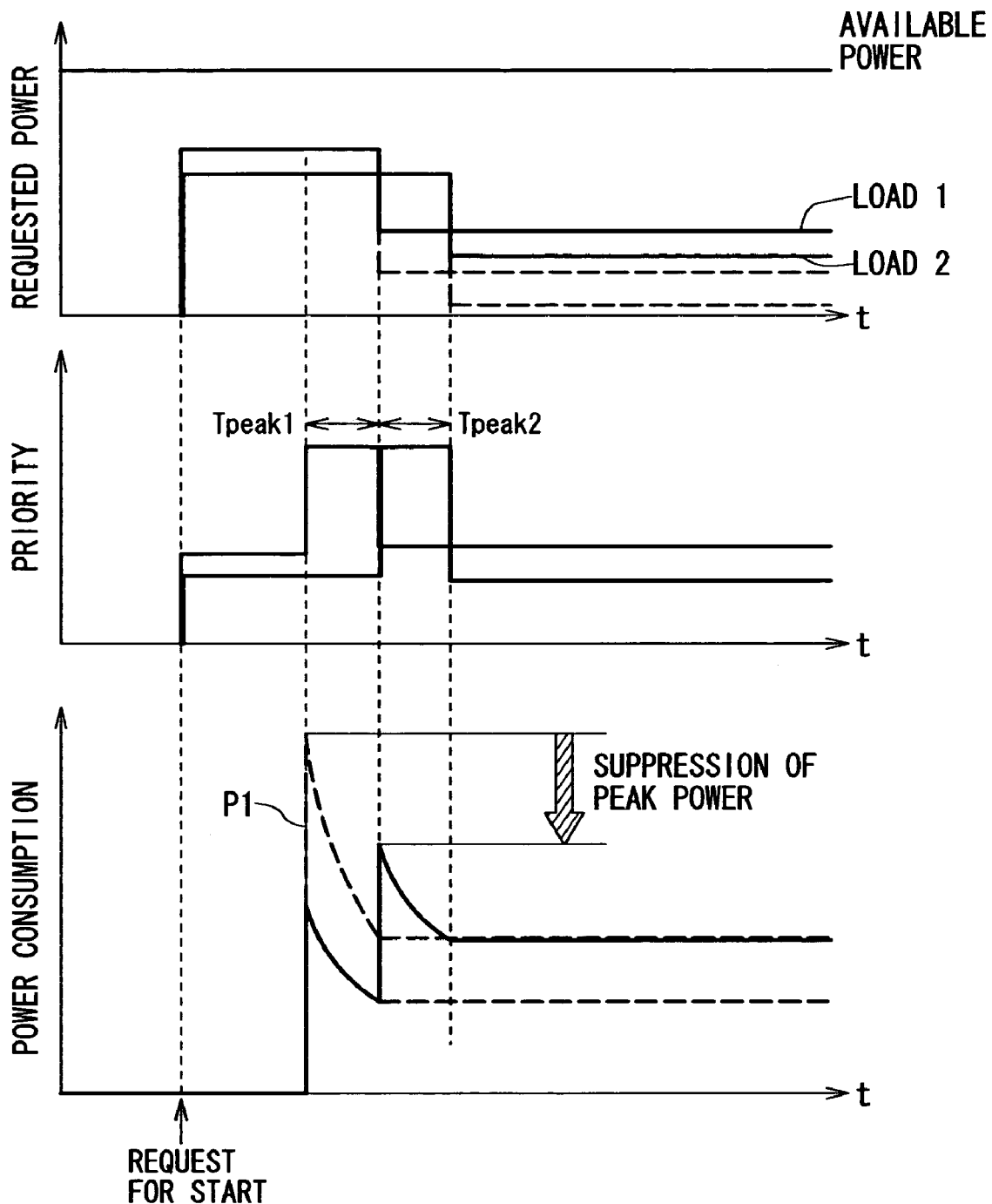
FIG. 15 shows timing charts exemplifying changes in each parameter, which are caused when activation requests for plural peak loads are issued at the same time.

Since the above operations and the setting of the priority for starting the peak load (shown in FIG. 8) are performed, even when plural start requests are issued at a time from plural peak loads (refer to FIG. 15), the loads are started in sequence in the descending order of the priorities as long as the power necessary for the start of the loads is secured. When one load is in the operation for the start, the priority thereof is relatively higher than the other loads, with the result in that the other loads are suppressed from starting. As a result, when the loads are commanded to start, the superposition of peak loads can be avoided or suppressed, thus preventing some drawbacks such as voltage drop due to a momentary over load in the power supply system. In FIG. 15, a reference P1 shows a power peak which will be caused when both the loads are activated at a time.

(Example of Operation)

Figure 16:
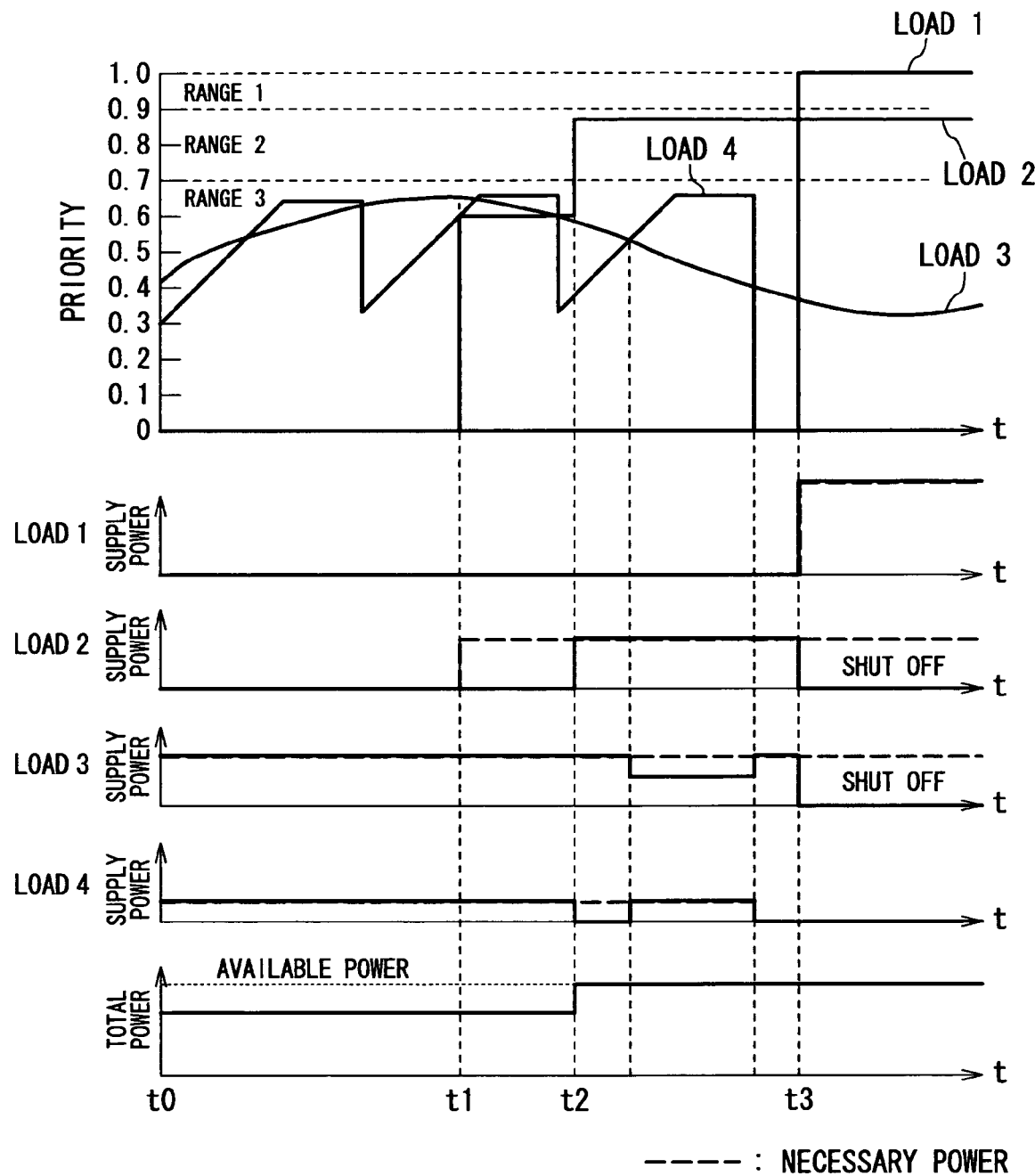
FIG. 16 is a timing chart exemplifying the operations of the on-vehicle load driving and controlling apparatus according to the first embodiment.

Referring to FIG. 16, the operation of the foregoing on-vehicle load driving and controlling system according to the present embodiment will now be exemplified.

During a period of time t0 to t1, only loads 3 and 4 are in operation (on state) and the total necessary power is less than a available power, so that the power is supplied to both the loads 3 and 4 according to amounts of the necessary power of each load. During anther period of time t1 to t2, a load 2 allowing a delay at a time when the power is turned on carries necessary power. However, in this case, the priority of the load 2 is in the priority range 3, the magnitude relationship of the priorities prohibits the load 2 from starting to drive, while the loads 3 and 4 are still maintained to be driven. Then another period of time t2 to t3 will be explained. At the time t2, the priority of the load 2 becomes larger relatively, so that the load 2 starts to be driven and at the same time, the priority of the load 2 is shifted to a value in the priority range 2. In response to the shift of the priority of the load 2, both of the loads 3 and 4 are driven according to changes in the magnitude relationship between their priorities in a time sharing manner such that the total power consumption does not exceed the available power. At the time t3, issued is a request for supplying power to a significant load 1 belonging to the priority range 1, with the result that the power is forced to be supplied to the load 1, while supplying the power to both the loads 2 and 3 is shut off instead. Hence, there can be provided an on-vehicle load driving and controlling system capable of securely supplying power to significant loads and preventing particular loads from being limited in their functions for a long time or from being stopped.

(Second Embodiment)

Figure 17:
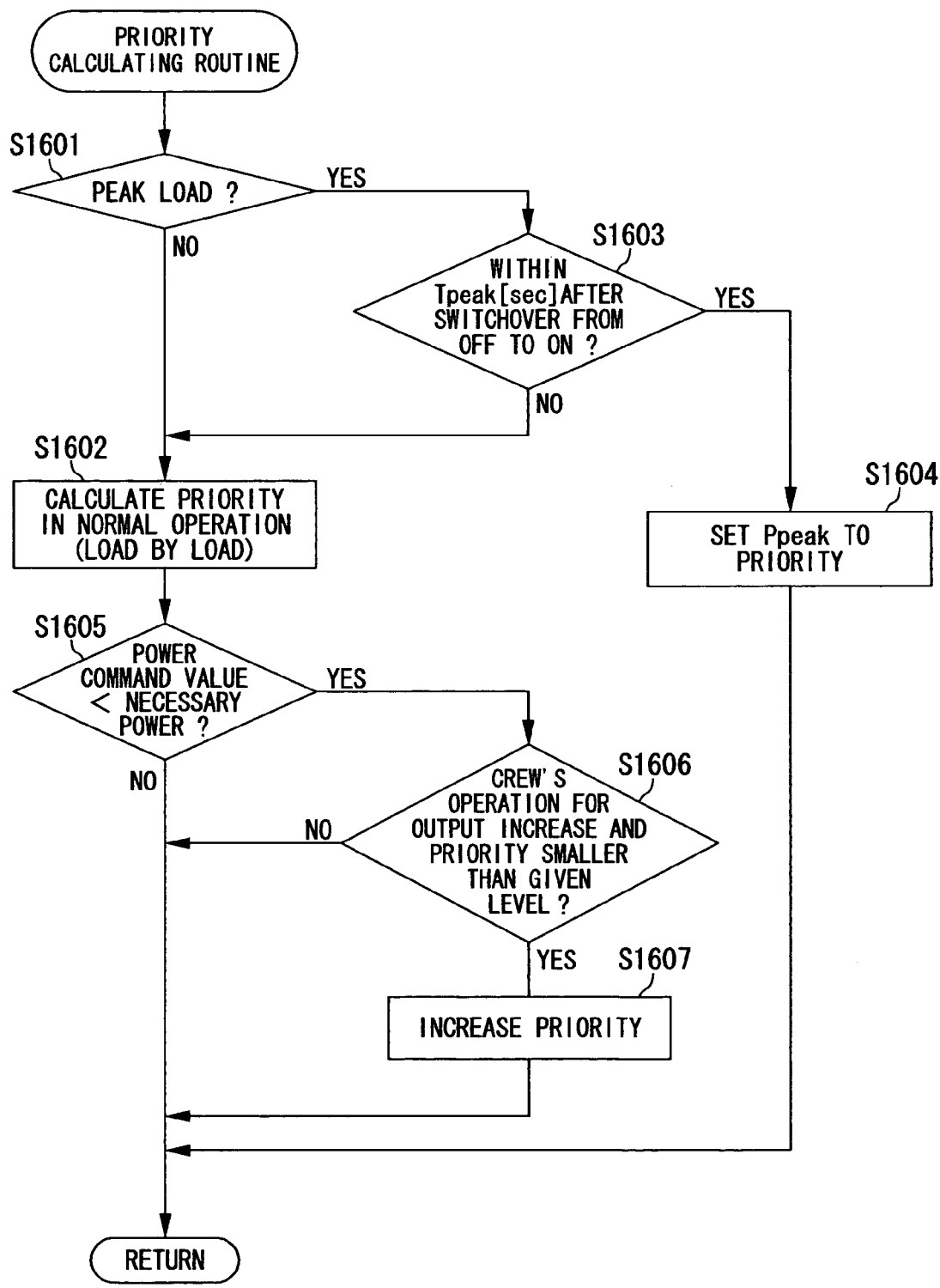
FIG. 17 is a flowchart showing another way of calculating the priority in a second embodiment of the present invention.

Referring to FIG. 17, a second embodiment of the present invention will now be described. The present embodiment relates to another example of the routine for calculating the priority. FIG. 17 shows a subroutine for such calculation. FIG. 17 corresponds to FIG. 8 in the first embodiment, in which steps S1601 to S1604 are the same as the steps in FIG. 8.

Figure 8:
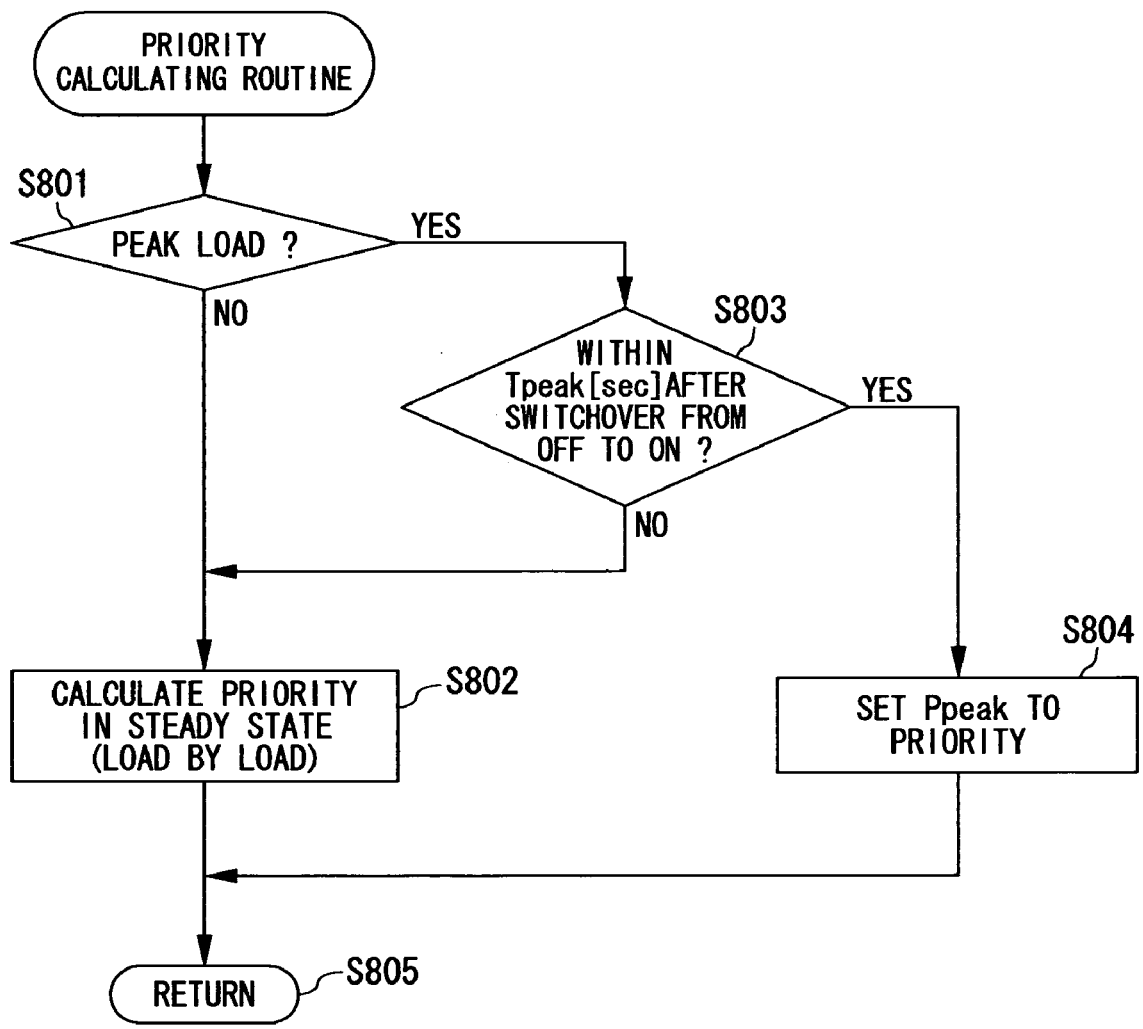
FIG. 8 is a flowchart explaining a priority calculating subroutine.

The subroutine shown in FIG. 17 is different from that in FIG. 8 in that steps S1605, S1606 and S1607 are added. To be specific, after calculating the priority in the normal operation, it is determined at step S1605 whether or not a power command value to each load is less than an amount of necessary power of the load. If the determination is YES (the power command value is less than the necessary power amount), the processing is then executed at step S1606. At this step S1606, it is further determined whether or not the calculated priority at step S1602 is still less than a predetermined priority that has been so far, regardless of having experienced crews' operations for increasing the output, such as turning on the power of a load and turning up the volume of the load. When the determination is affirmative (YES at step S1606), the processing is shifted to step S1607, where the priority is increased by a predetermined amount. In contrast, if the determination is NO at step S1606, the processing is returned to the main routine.

The above operations are able to increase the priority in response to a crews' request for increasing the output, even though the output power of each load to be controlled is under limitation, resulting in that the load can be operated in preference to others. The control of distributing the power can therefore be realized depending on crews' tastes.

(Third Embodiment)

Figure 18:
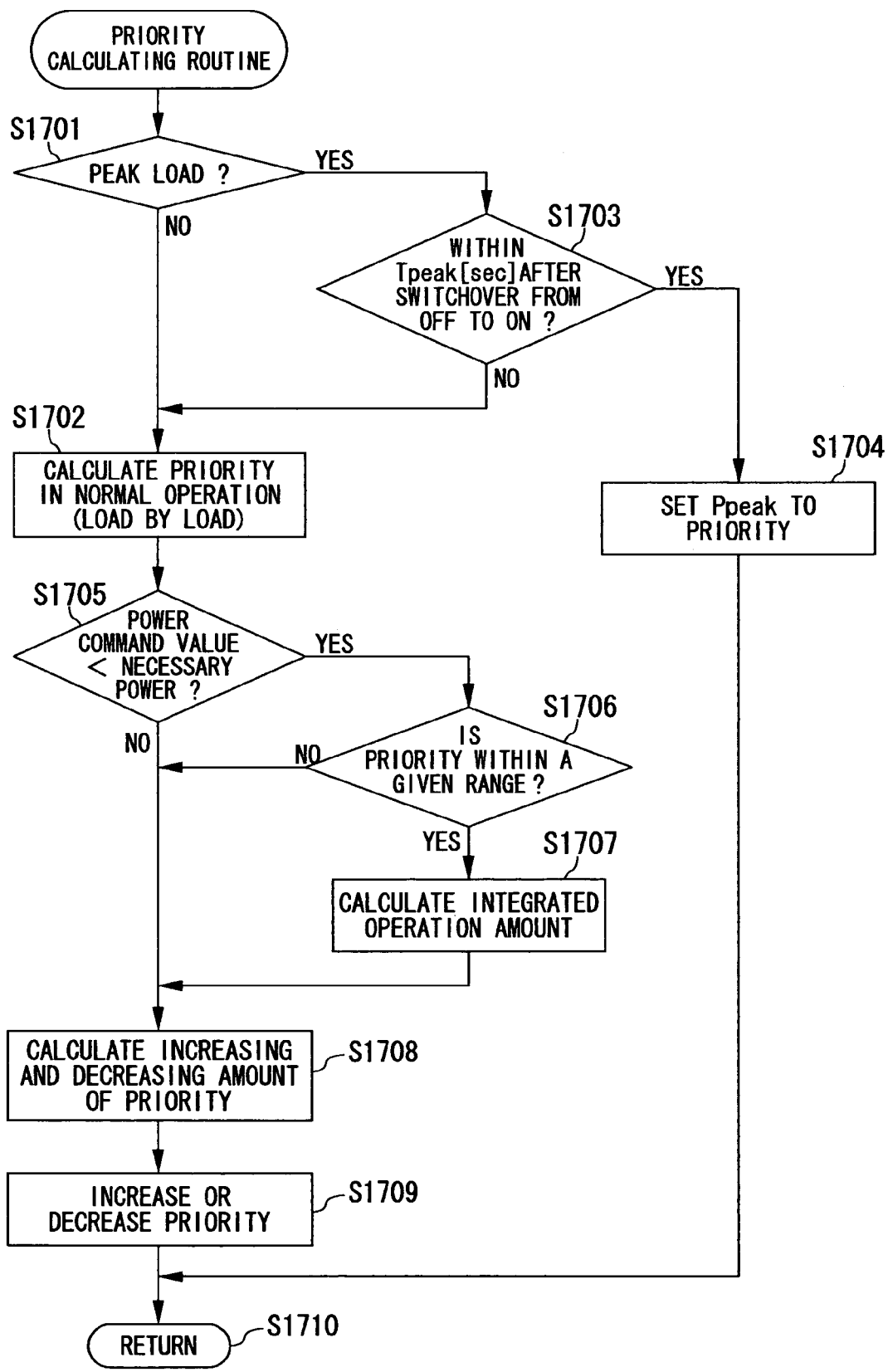
FIG. 18 is a flowchart showing another way of calculating the priority in a third embodiment of the present invention.
Figure 19:
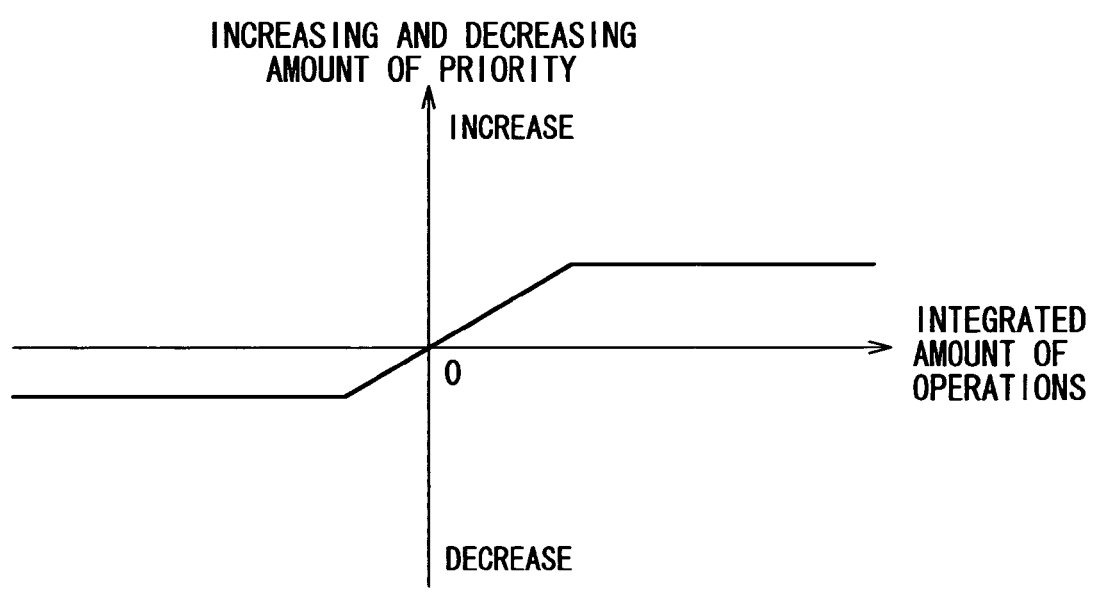
FIG. 19 shows a graph explaining a relationship between an integrated amount of operations and an increasing and decreasing amount of the priority.

Referring to FIGS. 18 and 19, a third embodiment of the present invention will now be described. The present embodiment relates to another example of the routine for calculating the priority. FIG. 18 shows a subroutine for such calculation. FIG. 18 corresponds to FIG. 8 in the first embodiment, in which steps S1701 to S1704 are the same as the steps in FIG. 8.

The subroutine shown in FIG. 18 is different from that in FIG. 8 in that steps S1705 to S1709 are added. To be specific, after calculating the priority in the normal operation, it is determined at step S1705 whether or not a power command value (i.e., power to be supplied) to each load is less than an amount of necessary power of the load. If determined YES at step S1705 (i.e, the power command value is less than the necessary power amount), the processing goes to step S1706, at which the priority is within a predetermined range inherent to the load. If YES at step S1706 (i.e., the priority is within the predetermined range), the processing is shifted to step S1707 to calculate an amount of integrated operations.

If NO at step S1706 (i.e., the priority is outside the predetermined range), the priority is regarded as being a value not to be corrected, thus the processing being shifted to step S1708.

The amount of integrated operations corresponds to an integrated amount of operations carried out toward each load. This integrated operation amount is calculated at step S1707 by not only incrementing (i.e., +1) a current integrating operation amount when it is found that operations (such as turning on the power of a load and turning up the volume of the load) involving an increase in the power consumption of a load but also decrementing (i.e., −1) a current integrated operation amount when it is found that operations (such as turning off the power of a load and turning down the volume of the load) involving an increase in the power consumption of a load.

Incidentally, even when the switch, volume, and/or others of each load are operated predetermined times or more within a given period of time after the limitation of the output power of the load, a predetermined amount is added to the current integrated operation amount. The information about the integrated operation amount is kept even when the vehicle's ignition switch is turned off.

After the calculation at step S1707, the processing is shifted to step S1708. Also, when the power command value is equal to or higher than the necessary power (NO at step S1705), the processing is shifted to step S1708.

At step S1708, the integrated operation amount obtained at step S1707 and a map shown in FIG. 19 are used to calculate an increase/decrease amount of the priority. This priority increase/decrease amount is an index showing that, as crew's operations involving an increase in the power consumption is increased during a period of time each load operates to output the power within a predetermined range, the priority increase/decrease amount takes a positive value corresponding to the increase, while, as crew's operations involving a decrease in the power consumption is increased, the priority increase/decrease amount takes a negative value corresponding to the decrease. After the calculation of this priority increase/decrease amount, the processing proceeds to step S1709 to increase or decrease the priority of each load by the priority increase/decrease amount calculated at step S1708. And the processing proceeds to step S1710 to return to the main routine.

The above processing makes it possible that a long-time tendency toward crews' tastes for each load is reflected in the calculation of a priority given to the load. Hence, a power distribution that is based on crews' tastes can be performed. In addition, after limiting the functions of a load, the priority of the load is raised, if a crew who had an unpleasant feeling turns off the load or performs a repeated increase/decrease of the volume of the load. Therefore, the crew's unpleasant feeling to limiting the load can be relieved.

(Fourth Embodiment)

Figure 20:
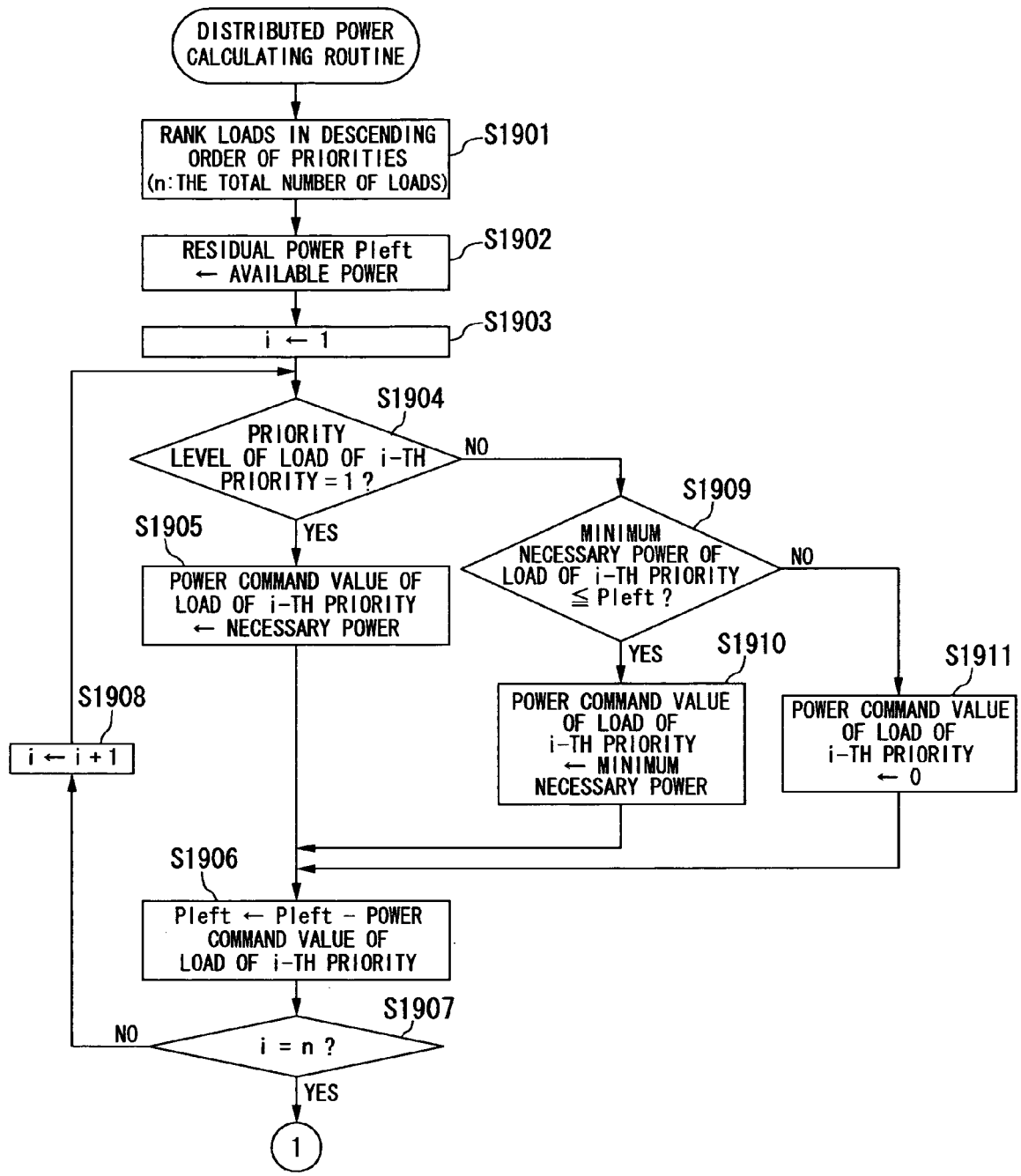
FIG. 20 is a flowchart showing another way of calculating the power to be distributed, which is combined with FIG. 21 and carried out in a third embodiment of the present invention.
Figure 21:
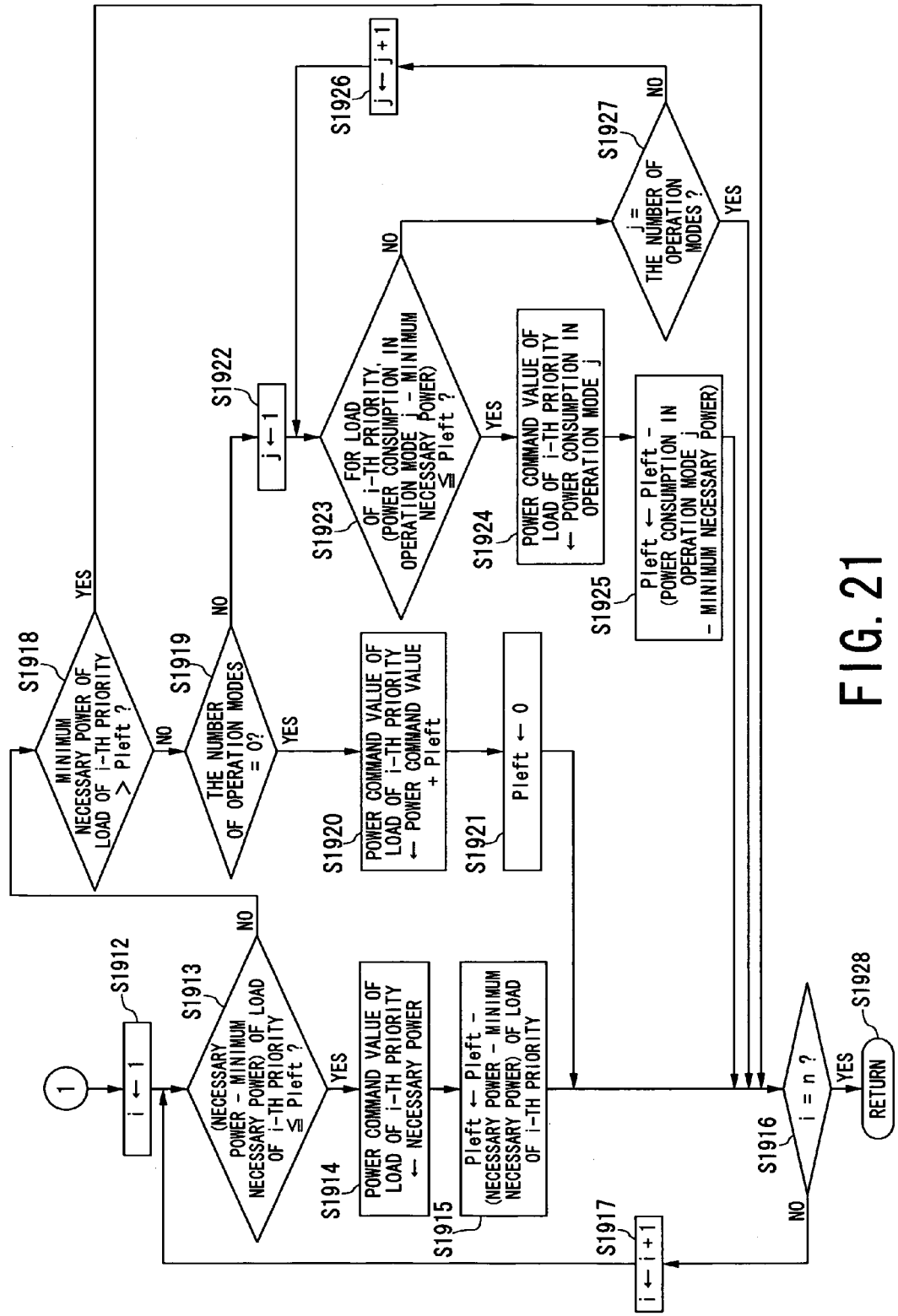
FIG. 21 is a flowchart showing another way of calculating the power to be distributed, which is combined with FIG. 20.

Referring to FIGS. 20 and 21, a fourth embodiment of the present invention will now be described. The present embodiment relates to another example of the routine for distributing the power. FIGS. 20 and 21 show a subroutine for such distribution. FIGS. 20 and 21 correspond to FIG. 5 in the first embodiment, in which steps S1901 1911 are almost the same as those in FIG. 5, although steps S1904, S1905, S1909, S1910, S1911, and S1906 are modified a little.

Through the processing at steps S1904, S1905, S1909, S1910, S1911, and S1906, a load having a priority of 1 is given an amount of power necessary for the load, whilst each of the remaining loads are given amounts of minimum necessary power in the descending order of the priorities as long as there remains power in the residual power Pleft.

At step S1912 in FIG. 21, the parameter "i" is reset to 1. The processing is shifted to step S1913, where it is determined whether or not a power (necessary power−minimum necessary power) concerning a load of the i-th priority is less than the residual power Pleft. When an amount of "necessary power−minimum necessary power" is less than the residual power Pleft (YES), a power command value (i.e., power to be supplied) to this load having the i-th priority is updated to the necessary power of this load at step S1914. The processing is then shifted to step S1915.

At step S1915, the amount of "necessary power−minimum necessary power," which is to be added concerning this load, is subtracted from the residual power Pleft, and the processing is shifted to step S1916.

Meanwhile, when the amount of "necessary power—minimum necessary power" is equal to or larger than the residual power Pleft (NO at step S1913), the processing is shifted to step S1918 to determine whether or not the minimum necessary power of the load of the i-th priority is larger than the residual power Pleft. If the determination is YES at step 1918 (i.e, the minimum necessary power is larger than the residual power Pleft), the processing goes to step S1916. In contrast, when the determination is NO at step S1918 (i.e, the minimum necessary power is equal to or less than the residual power Pleft), the processing is done at step S1919, where it is determined if the number of operation modes of the load having the i-th priority is zero or not. If the number is zero (YES), the processing goes to step S1920 to add the residual power Pleft to the power command value of the load of the i-th priority. Then at step S1921, the residual power Pleft is set to zero, before going to step S1916.

At step S1919, in cases where the number of operation modes is not zero (NO), the index variable "j" is set to 1, and the processing goes to step S1923. At this step S1923, as to the load having the i-th priority, it is determined if a power difference of "power consumption−minimum necessary power" of the load under the operation mode "j" is equal to or less than the residual power Pleft. If the determination is YES (i.e., the power difference is equal to or less than the residual power Pleft), the processing is then carried out at step S1924 such that the power command value in the operation mode of the i-th priority is updated to an amount of power consumption in the operation mode of "j." Then, at step S1925, the power difference (an amount of "power consumption−minimum necessary power" under the operation mode "j") is subtracted from the residual power Pleft, before going to step S1916.

If it is determined at step S1923 such that the power difference of "power consumption−minimum necessary power" of the load under the operation mode "j" is larger than the residual power Pleft (NO), the processing is then carried out at step S1927 to further determine if or not the index variable "j" becomes equal to the number "n" of loads. If the determination is YES (i.e., the equality is realized), the processing is carried out at step S1916, while the opposite determination to the above comes out, the processing goes to step S1926. The index variable "j" is added by 1, before returning to step S1923.

At step S1916, it is determined whether or not the index variable "j" reaches the number "n" of loads. If such a condition is not met (NO at step S1926), the index variable "j" is subjected to addition of 1 at step S1917, before returning to step S1913. By contrast, the index variable "j" reached the number "n" (YES at step S1916), the processing is returned to the main routine via step S1928.

Through the foregoing operations, significant loads having a priority of 1 are given an amount of requested power, as it is requested (without any limitation). Thus, the necessary power is sufficiently supplied to the significant loads in charge of the fundamental functions of a vehicle, whereas the minimum necessary power is first assigned to the remaining loads in the descending order of the priorities, and the residual power is then distributed to the remaining loads in the descending order of the priorities. By this two-stage power distribution technique, the number of loads that are subjected to their functional limitations can be reduced to a minimum, with the available power still kept.

(Fifth Embodiment)

Figure 22:
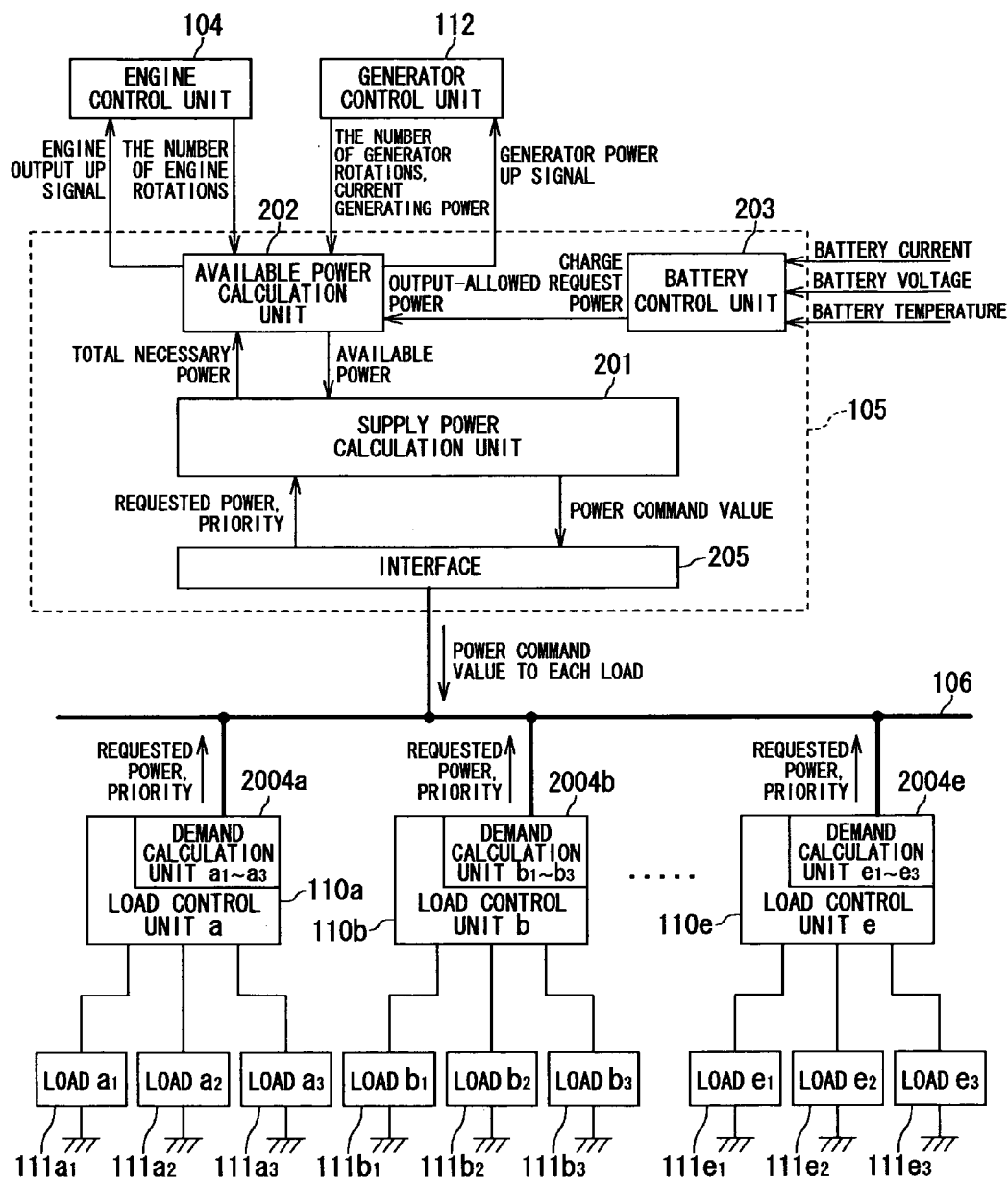
FIG. 22 is a block diagram showing another example of the on-vehicle load driving and controlling apparatus in a fifth embodiment of the present invention.

Referring to FIG. 22, a fifth embodiment of the present invention will now be described. The present embodiment concerns with another configuration of the on-vehicle load driving and controlling system according to the present invention.

FIG. 22 corresponds to FIG. 2 in the foregoing first embodiment and the other configuration of the on-vehicle load driving and controlling system according to the present embodiment is identical or similar to those shown in the first embodiment.

The configuration shown in FIG. 22 differs from that shown in FIG. 2 in that demand calculation units 2004a (a1 to a3) to 2004e (e1 to e3) which are in charge of monitoring respective loads are incorporated in the load control units 110a to 110e, not in the power control units 105.

Accordingly, in the present embodiment, the calculation of the priority, necessary power, and minimum necessary power is carried out by the respective load control units 110a to 110e, and the calculated results are sent to the power control unit 105 via the multiple signal transmission line 105.

In addition, the information concerning the number of modes and the amounts of power consumption in the various operation modes is stored in the load control units corresponding to the loads, respectively, unlike the first embodiment in which such information are stored in the supply power calculation unit 201. Thus, whenever needed, such information is sent from the load control units 110a to 110e to the power control unit 105 via the multiple signal transmission line 106, respectively.

By this configuration, the power control unit 105 is able to not to have the inherent information about each load and can obtain such information when the need arises.

Hence, even when the configuration of electrical loads is changed and/or the number of electrical loads is increased or decreased, it is unnecessary to exchange the power control units 105. Only exchanging or adding electrical loads including load control units is enough, providing the identical advantages to the foregoing embodiments. A period of time for developing the apparatus can be shortened and manufacturing cost can be suppressed.

(Sixth Embodiment)

Referring to FIGS. 23 to 26, another example of the routine for calculating the power to be distributed will now be described.

Figure 5:
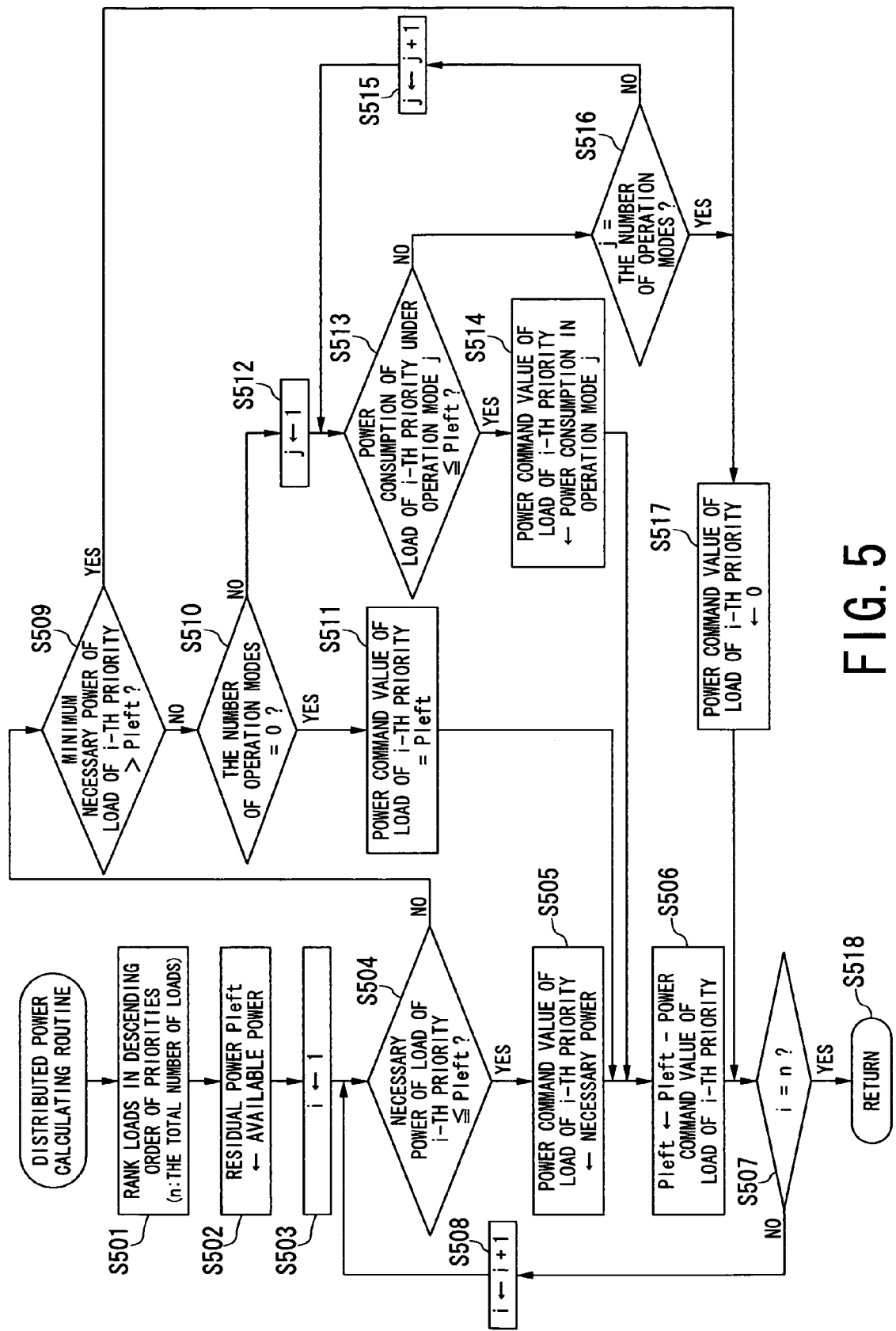
FIG. 5 shows a flowchart for functionally realizing a distributed power calculating subroutine shown in FIG. 3.
Figure 23:
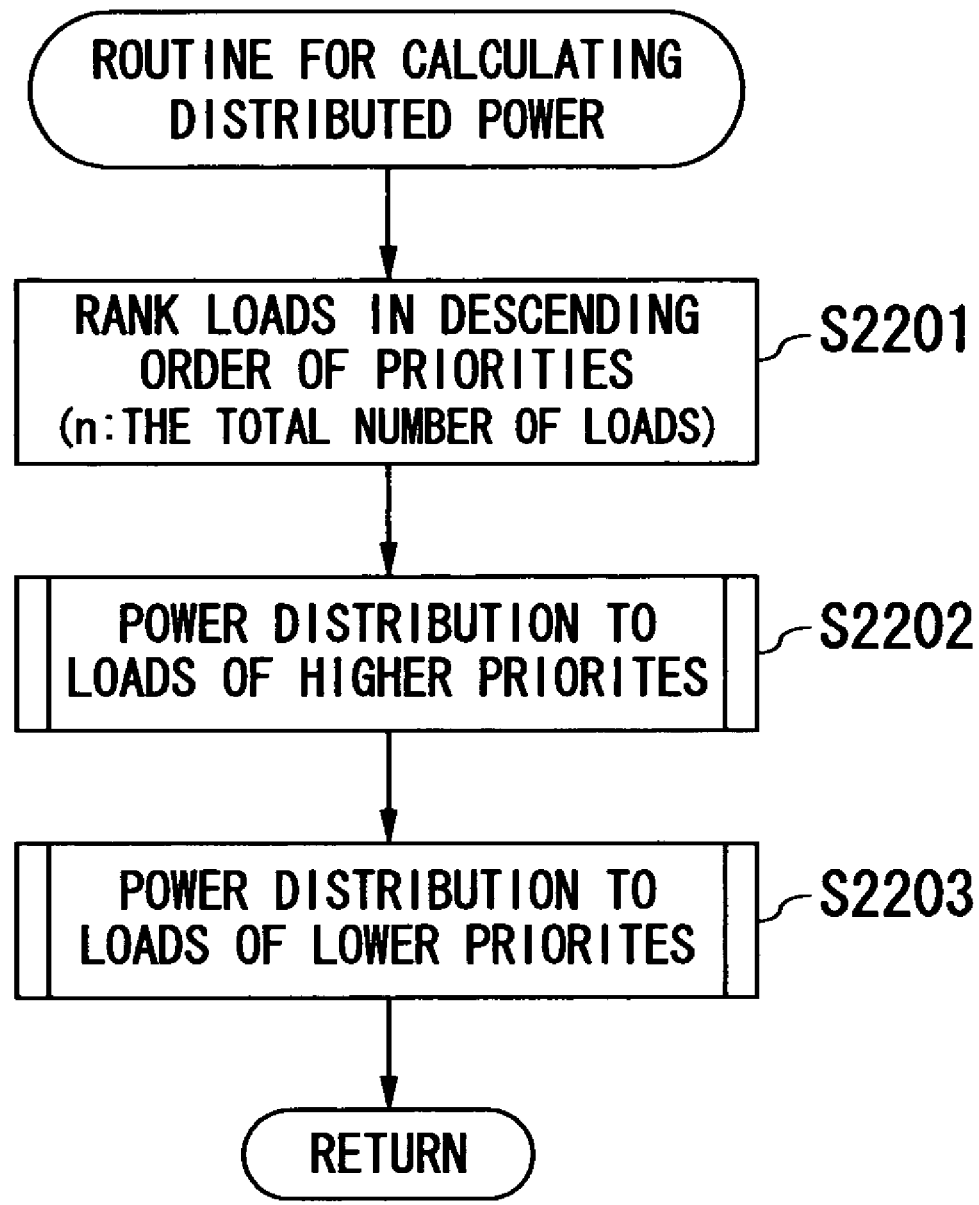
FIG. 23 is a flowchart showing another way of calculating the power to be distributed in a sixth embodiment of the present invention.

FIG. 23 corresponds to FIG. 5 explained in the first embodiment. The remaining configurations are identical to those in the first embodiment.

The sixth embodiment is characterized in that how to distribute the electric power is different from each other between loads having upper priorities (for example, the priorities ≧0.7) and loads having lower priorities (for example, the priorities <0.7).

In the routine processing shown in FIG. 23, at step S2201, the loads are ranked in the descending priority order. Then, at step S2202, the power is first distributed to the loads whose priorities are higher, and the residual power left after the distribution to the upper-priority loads is distributed to the loads whose priorities are lower.

Figure 24:
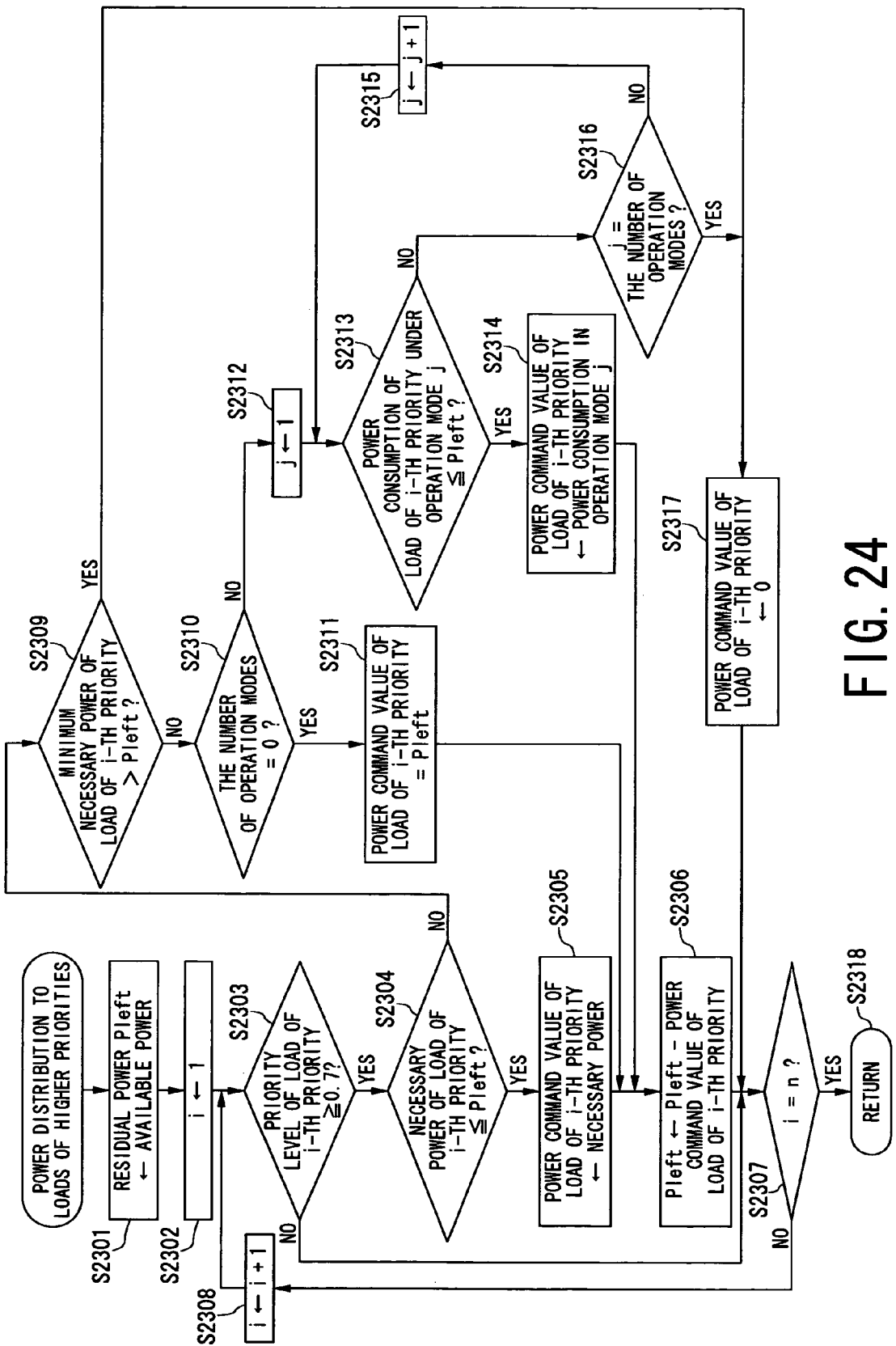
FIG. 24 is a block diagram showing another example of the on-vehicle load driving and controlling apparatus.

The power-distributing subroutine at step S2202 will now be detained with reference to a flowchart shown in FIG. 24. This subroutine (consisting of steps S2301 to S2318) is almost the same as the power-distributing routine shown in FIG. 5. A difference is that, at step S2302, it is determined whether or not a load to which the power is distributed has an upper priority (for example, ≧0.7) and the power is distributed to only the upper-priority load based on the determined results in this subroutine.

Figure 25:
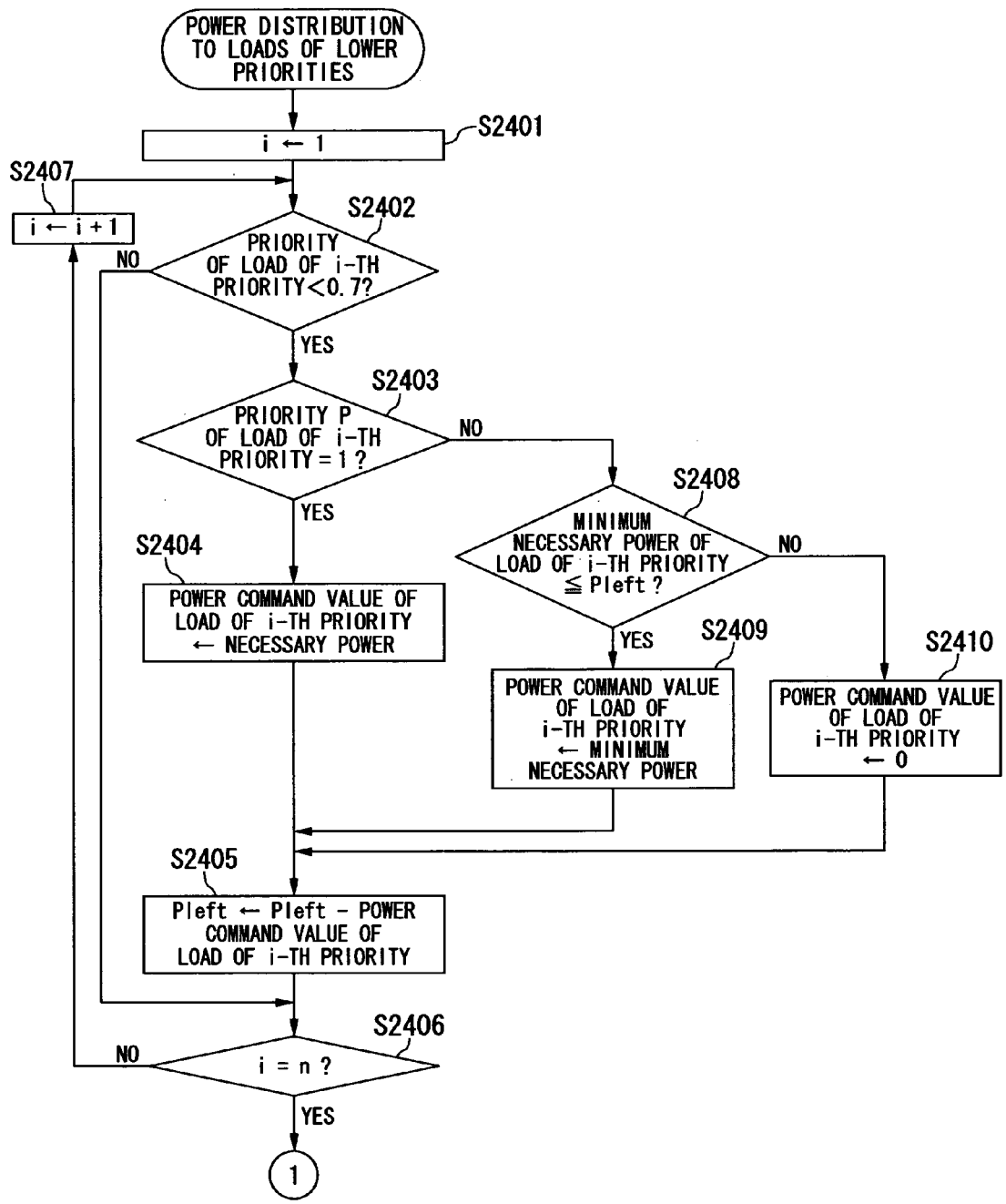
FIG. 25 is a flowchart showing another way of calculating the power to be distributed, which is combined with FIG. 26.
Figure 26:
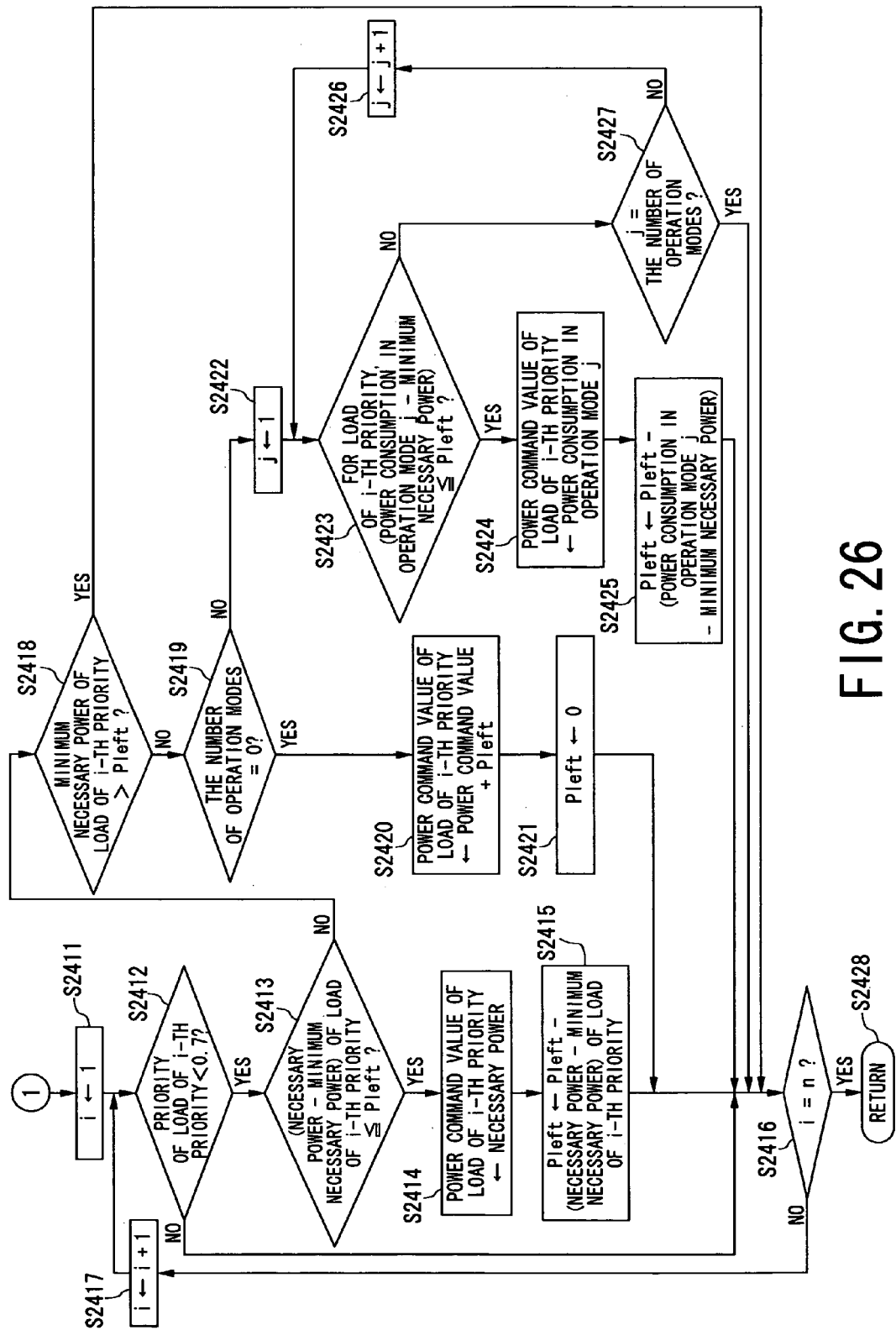
FIG. 26 is a flowchart showing another way of calculating the power to be distributed, which is combined with FIG. 25.

The power-distributing subroutine at step S2203 will now be detained with reference to flowcharts shown in FIGS. 25 and 26. This subroutine (consisting of steps S2401 to S2428) is almost the same as the power-distributing routine shown in FIGS. 20 and 21. Only differences are to distribute the residual power left after the power distribution to the loads whose priority levels are higher and to determine whether or not a load to which the power is distributed has a lower priority (for example, <0.7). Then, the power is distributed to only the lower-priority load based on the determined results in this subroutine. Hence, to the loads whose priorities are lower, as described in the fourth embodiment, the power is distributed in such a manner that the number of loads subjected to functional limitations is minimized in an available power range.

Accordingly, in the present embodiment, as shown in FIG. 7, to the loads whose priorities are higher and whose functions are required to have their full capabilities, the power is distributed without any limitations. In contrast, to the loads whose priorities are lower and which allow interruptions or delays in power supply, the power is distributed such that the number of loads whose functions stop is minimized. In other words, it is possible to suppress the number of loads brought into a complete shutdown. Thus, deterioration in a driving feeling resulting from the complete shutdown of the loads can be minimized. At the same time, even when it is required to limit the power to be supplied to upper-priority loads, some loads which have truly higher priories can still be driven to have their full operations.

(Seventh Embodiment)

Figure 27:
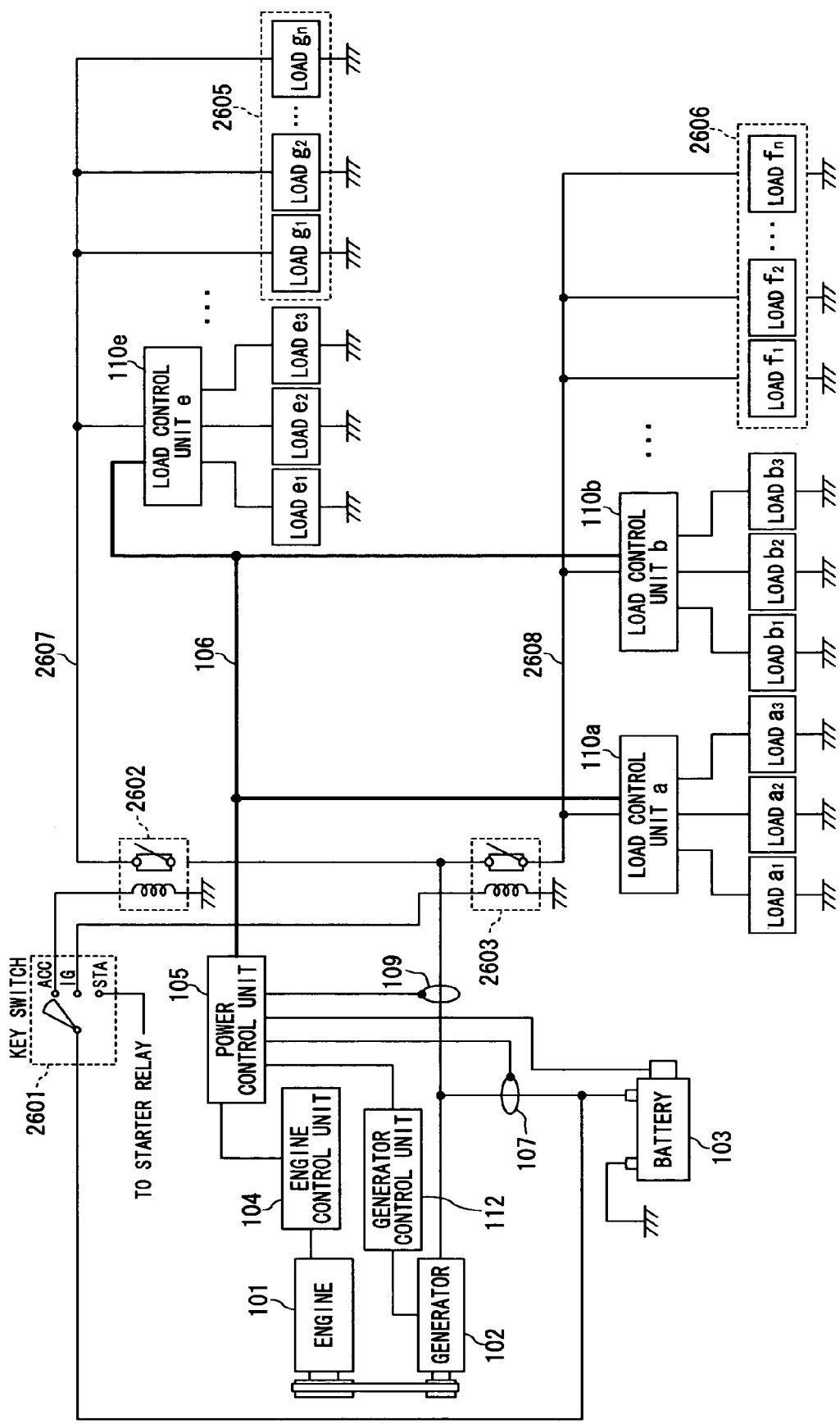
FIG. 27 is a block diagram showing another example of the on-vehicle load driving and controlling apparatus in a seventh embodiment of the present invention.
Figure 28:
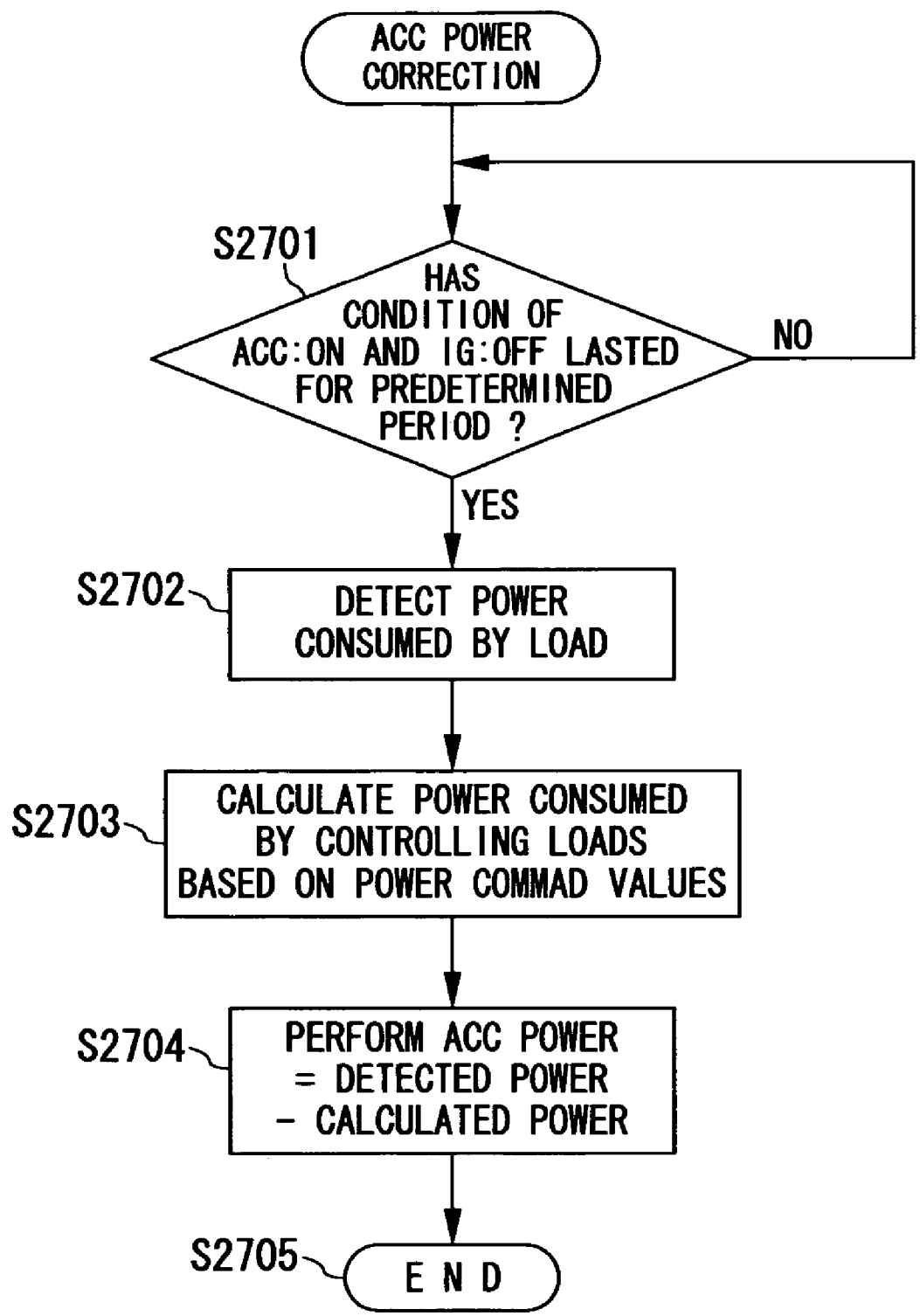
FIG. 28 is a flowchart showing another way of calculating the power to be distributed.
Figure 29:
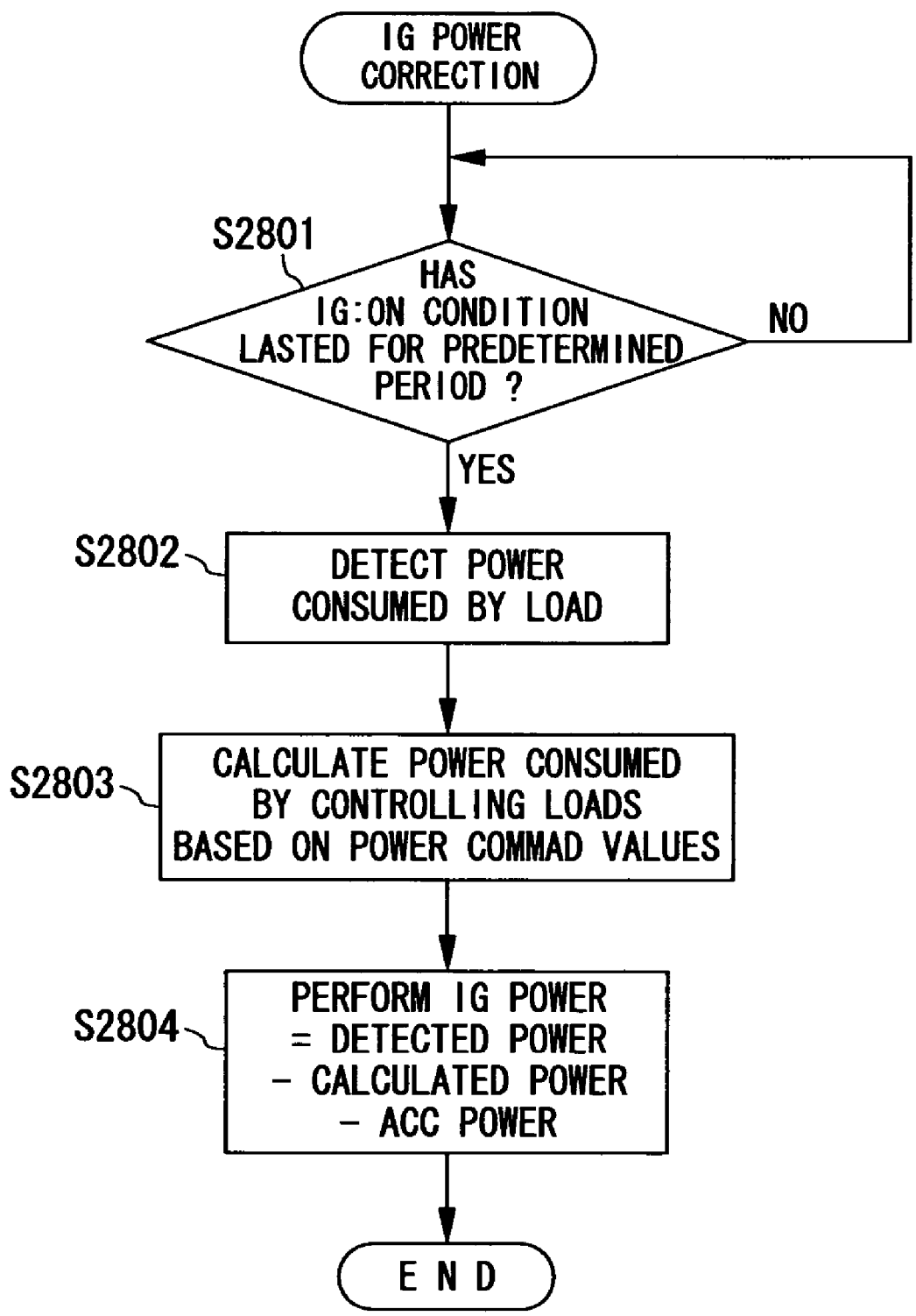
FIG. 29 is a flowchart showing another way of calculating the power to be distributed.

Referring to FIGS. 27 to 29, a seventh embodiment of the present invention will now be described. The present embodiment concerns with another configuration of the foregoing power supply system incorporated in the on-vehicle load driving and controlling apparatus according to the invention.

An on-vehicle load driving and controlling apparatus shown in FIG. 27 is provided with, in addition to the components shown in FIG. 1, a key switch 2601 (not shown in FIG. 1), ACC relay 2602, and IG (ignition) relay 2603.

When the key switch 2601 is turned to its ACC position, the AC relay 2602 turns on, thus having the power supplied along an ACC power line 2607. Meanwhile, when being turned to its IG position, the IG relay 2603 is activated (ON), thus having the power supplied along an IG power line 2608. A group of loads: 2605 denotes electrical loads directly connected to the ACC power line 2607 and is composed of a computer or others for control electrical components. Another group of loads: 2606 is composed of loads directly connected to the IG power line 2608 and includes electrical loads necessary for communication and control processing with and of the power control unit 105 and load control units 110a to 110e. Both of the load groups 2605 and 2606 are imaginarily treated as a single load, which composes a load to which the power is distributed in the first embodiment. The necessary power of each of the loads is previously measured and memorized as default values and such loads are regarded as always-necessary loads (i.e., their priority=1). The necessary power of each of the load groups may vary on account of vehicle's changes over time and after-buying addition of electrical accessory devices, which is not intended by vehicle designers), so that the necessary power is corrected in a proper manner as below.

FIG. 28 shows a routine for correcting the necessary power of the load group 2605.

First, at step S2701, it is determined whether or not a condition where the ACC relay 2602 is on and the IG relay 2603 is off has lasted for a predetermined period of time necessary for obtaining the stability of power consumption. IF YES at step 2701 (i.e, such period of time has been waited), the processing is shifted to step S2702, where a current value detected by the current sensor 109 is multiplied by a voltage value on the power line so that an amount of the entire power consumption of the loads is calculated. Then at step S2703, using a sum of power command values to the loads other than the load group 2605, an amount of power consumed by the remaining controlling loads is calculated. And at step S2704, the calculated amount at step S2703 is subtracted from the detected amount at step S2702, thus providing the necessary power of the load group 2605.

FIG. 29 shows a routine for correcting the necessary power of the load group 2606.

First, at step S2801, it is determined whether or not a condition where the IG relay 2603 is on has lasted for a predetermined period of time necessary for obtaining the stability of power consumption. IF YES at step 2801 (i.e, such period of time has been waited), the processing is shifted to step S2802, at which a current value detected by the current sensor 109 is multiplied by a voltage value on the power line so that an amount of the entire power consumption of the loads is calculated. Then at step S2803, using a sum of power command values to the loads other than the load group 2606, an amount of power consumed by the remaining controlling loads is calculated. And at step S2804, the calculated amount at step S2803 is subtracted from the detected amount at step S2802, and then, from such a subtracted result, the amount of necessary power of the load group 2605 obtained at step 2704 is subtracted again. Thus, this provides the necessary power of the load group 2606. The foregoing correction is carried out at intervals (for instance, one per day).

The first to sixth embodiments have been described on the assumption that all the electrical loads have controllers to control the power consumption thereof. This configuration, however, in effect, may cause some loads to have a difficult that the on and off of the power supply cannot be controlled, because the turn-on of the ignition key directly connects the power line and the loads. Such loads often require to operate without rest in order to maintain vehicle functions realized by, for example, an electrical control unit (ECU) and to detect vehicles conditions, so that the shutdown of the power supply to those loads cannot be permitted. This means that, in many cases, adding the functions of managing the on/off operations of the power to each of such loads is unreasonable in terms of production cost.

Therefore, as stated in this seventh embodiment, making a group of those loads requiring restless power supply (i.e., the priority=1) is effective for preventing the software and hardware thereof from making larger in scales. Additionally, it is easier to reflect changes in the load groups over time and users' after-buying addition of accessory devices in the control of the power to be distributed.

(Eighth Embodiment)

Referring to FIGS. 1 and 30 to 35, an eighth embodiment of the present invention will now be described.

Figure 30:
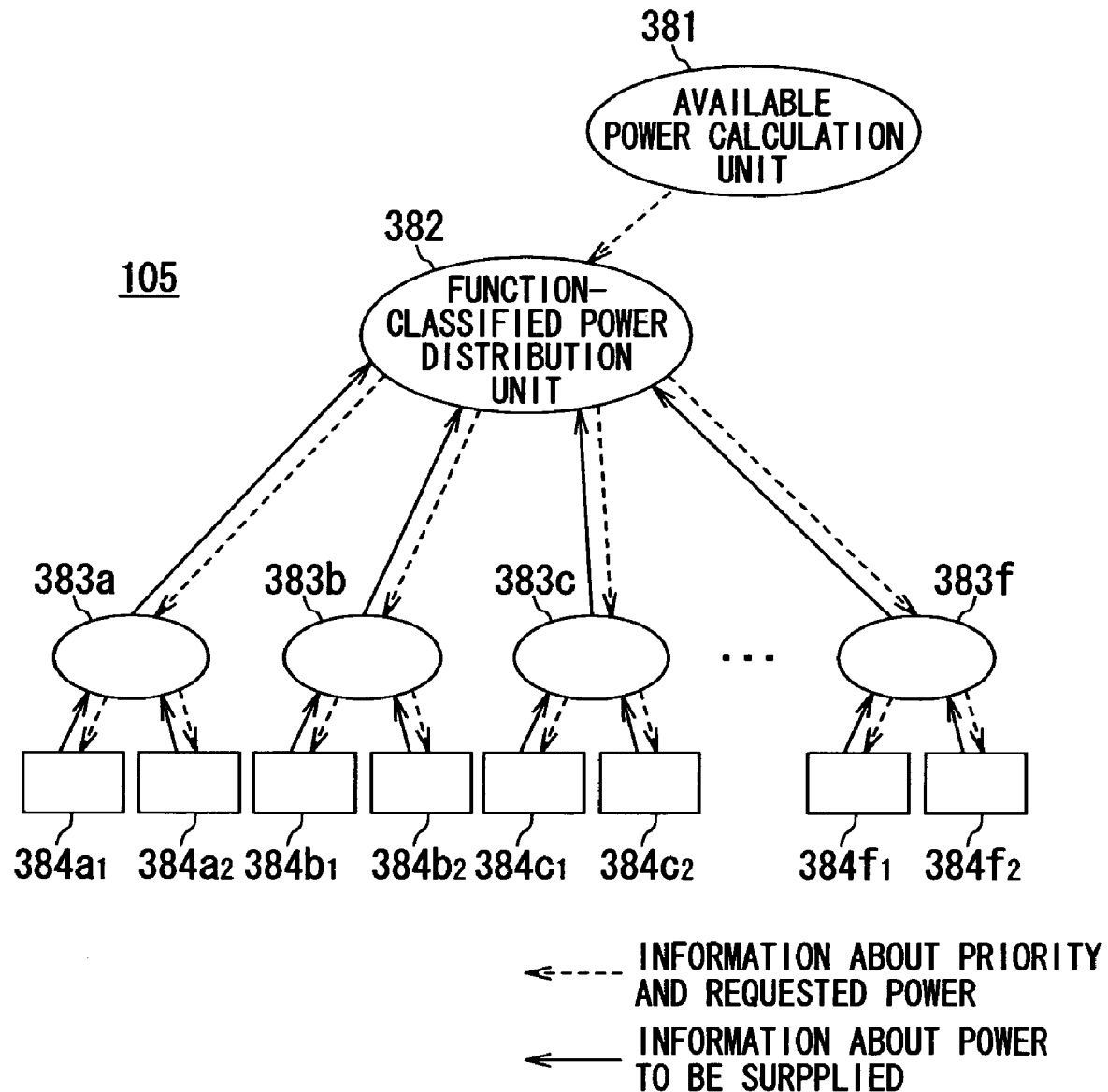
FIG. 30 is a functional block diagram showing an on-vehicle load driving and controlling apparatus according to an eighth embodiment of the present invention.

The on-vehicle power supply system according to this embodiment is provided the configuration shown in FIG. 1, which includes an on-vehicle load driving and controlling apparatus functionally realized, s shown in FIG. 30.

This apparatus is functionally provided with an available power calculation unit 381, a function-classified (group-classified) power distribution unit 382, and individual load power distribution units 383a to 383f.

Of these units, the available power calculation unit 201 uses information indicative of battery voltage, batter current, generator rotation number, and others to calculate a maximum amount of electric power that can be supplied at present (that is, available power). Information about the calculated amount of available power is sent to the function-classified power distribution unit 382.

The function-classified power distribution unit 382 is configured to receive information indicating a priority (group priority) given to each group of loads coming from each of the individual load power distribution units 383a to 383f and necessary power for each group of loads, and calculate an amount of power to be supplied to each group of loads. Information indicting the calculated amounts of power is sent to the individual load power distribution units 383a to 383f.

Each of the individual load power distribution units 383a to 383f, which is in charge of controlling drive of loads group by group, is placed correspondingly to each group. The "group" is classified based on the functions of each electrical load and one or more electrical loads belong to each group.

Each of the individual load power distribution units 383a to 383f receives information about both of a priority (load priority) and necessary power for drive (necessary power) given to each load in each group, from each of load priority/necessary power calculation units 384a1 to 384f2, and calculate, group by group, a sum of the necessary power amounts coming from the load priority/necessary power calculation units 384a1 to 384a2 (to 384e1 to 384e2). The calculated sum is sent, as an amount of necessary power for each group, to the function-classified power distribution unit 382.

In addition, each of the individual load power distribution units 383a to 383f operates such that, in response to an amount of power supplied from the unit 382 to each unit 383a (to 383f) and the priorities (load priorities) and amounts of necessary power of one or more loads belonging to each group, each unit 383a (to 383f) sends information about the amount of power to be supplied to each load to each of the load priority/necessary power calculation units 384a1 to 384a2 (to 384e1 to 384e2) belonging to each group.

Each of the load priority/necessary power calculation units 384a1 to 384f2 is arranged to each load, one to one. Each unit 384a1 (to 384f2) is configured to decide a priority (load priority) and an amount of necessary power of each load managed by each unit itself, and then sends information about the decided load priority and necessary power of each load to each of the individual load power distribution units 383a to 383f, to which each unit 384a1 (to 384f2) belongs. Furthermore, each unit 384a1 (to 384f2) is also able to receive information about an amount of power to be supplied from each of the individual load power distribution units 383a to 383f, and send out the received information to each of the load control units 110a to 110e via the multiple signal transmission line 106.

Based on the information about the received amount of power to be supplied, the load control units 110a to 110e each control power supply to the loads connected to each unit 110a (to 110e), on condition that an amount of power consumed by the loads is, group by group, kept within the amount of supplied power.

Figure 32:
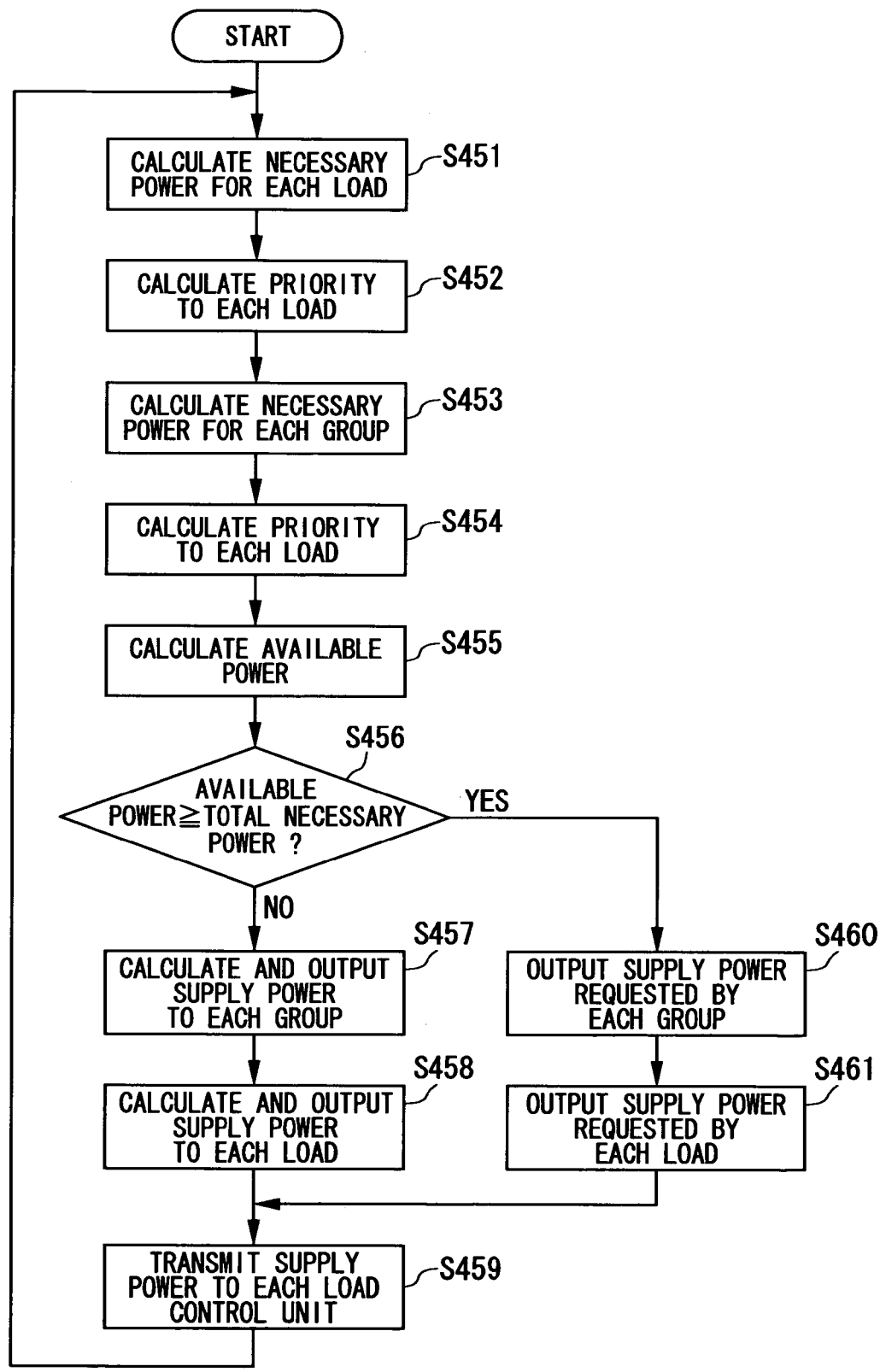
FIG. 32 is a flowchart showing the operation of a power control circuit.

Referring to FIG. 32, the operations of the power control unit 105 will now be described.

The processes at steps S451 and S452 functionally compose the load priority/necessary power calculation units 384a1 to 384f2. Each unit 384a1 (to 384f2) uses crews' operated conditions toward electrical loads, such as switches and volume controls, and operating conditions of loads, to calculate a priority to be given to each load and an amount of necessary power of each load. Information about such priority and necessary power is sent to each of the individual load power distribution units 383a to 383f.

Each unit 383a (to 383f), which has received the information about the priority and necessary power to and of each load, carries out the processing at steps S453 and S454. That is, the amounts of power necessary of the loads are summed up at step S453. Then, a priority to be given to each group (group priority) is calculated based on inputted information about the vehicle, and such information is provided to the function-classified power distribution unit 382 so as to perform upper-class power distribution control.

Figure 33:
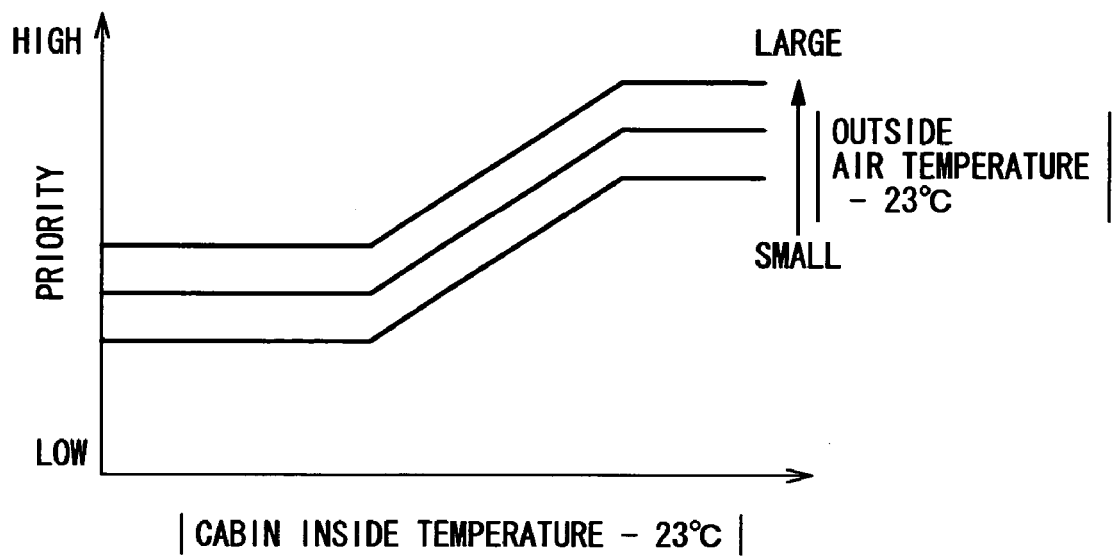
FIG. 33 is a graph to explain a relationship between a cabin inside temperature and a group priority.

In the present embodiment, depending on inputted vehicle information about vehicle's driven states, environmental conditions, and others, each group priority is decided based on a predetermined algorithm. For instance, in the case of the group of a cooling and heating system to which the blower and heater of an air conditioner belongs, the group priority is decided in consideration of various factors, such as outside air temperature and cabin inside temperature. As shown in FIG. 33. when an absolute value of a deviation of the temperature from an optimum temperature (for example, 23° C.) is larger, the group priority is set to higher values, while the temperature is around a suitable value for crews, the group priority is reduced and set to lower values. The suitable temperature can be set by reading out it from a memory in which such information about the suitable temperature is stored. Alternatively, crews can set any suitable temperature by manually operating a switch mechanism or others.

Figure 34:
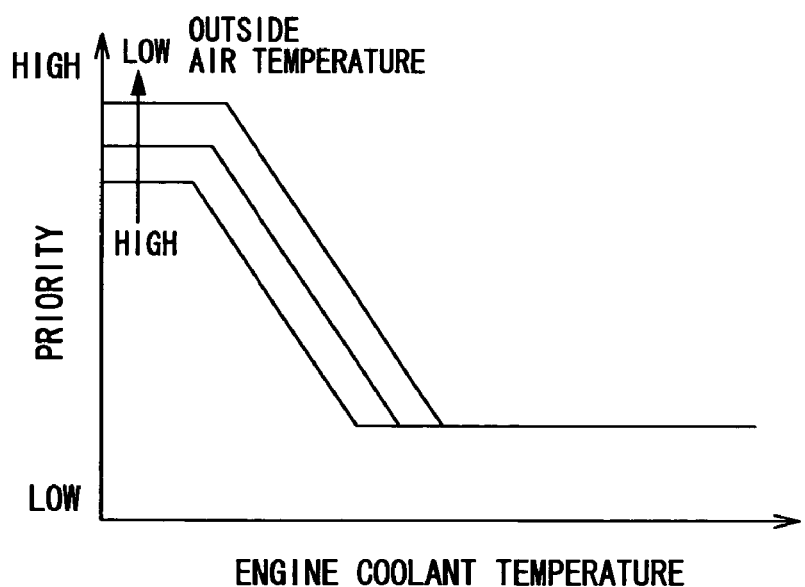
FIG. 34 is a graph to explain a relationship between an engine coolant temperature and a group priority.
Figure 35:
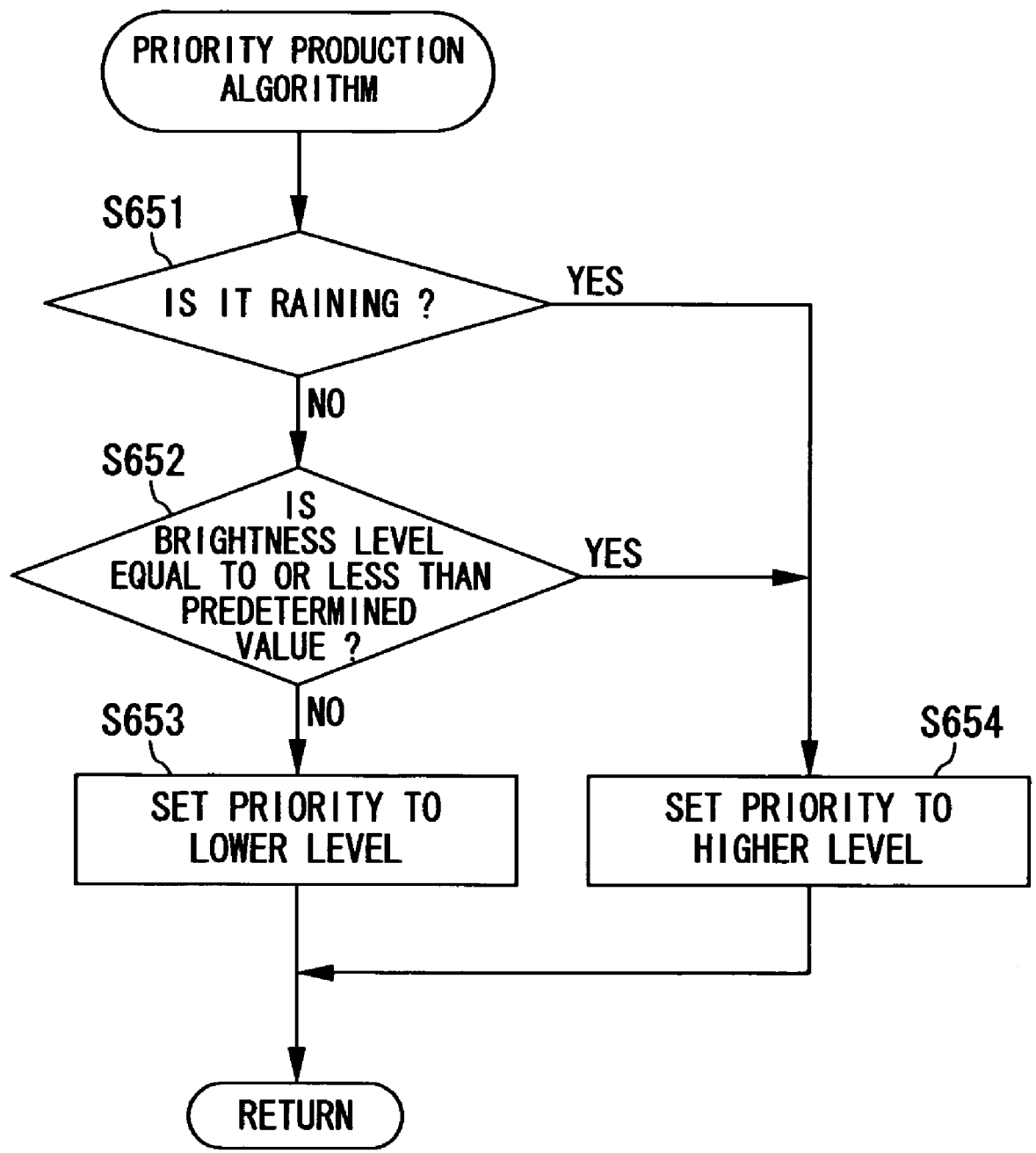
FIG. 35 shows a flowchart to explain a routine for calculating the priority based on an outside illumination level.

Further, for the group of a warm-up system to which loads such as electric heating catalyzer and defogger belong, the group priority is decided based on warm-up conditions of the vehicle, which can be estimated from outside air temperature and engine coolant temperature. By way of example, as illustrated in FIG. 34, in cases where it is estimated that a warm-up operation is necessary because the outside air temperature and engine coolant temperature are lower, the group priority is set to higher values.

Still, for the group of a lighting/viewing system to which lamps and wipers belong, the group priority is decided based on signals from an illumination sensor (not shown) detecting a brightness degree surrounding the vehicle and a rainfall sensor (not shown) detecting rainfall. When the detection is made to inform that it is dark outside the vehicle and/or it is raining, the group priority is set higher values, while the group priority is otherwise set to lower values.

At first, if it detected at step S651 that it is raining (YES), the group priority is raised, before being returned to a main routine. In contrast, it is determined that it is not raining (NO at step S651), it is further determined that an illumination (brightness) level is equal to or lower than a predetermined value (step S652). If such a condition is met (YES), the processing is shifted to step S654. In contrast, if being above the predetermined value (NO at step S652), the processing is shifted to step S653 to lower the group priority, and then returned to the main routine.

Moreover, if a group is composed of loads including significant loads necessary for full-time operations (that is, significant group), the group priority is always set to a value higher than that for the other groups.

Then the available power calculation unit 381 calculates an amount of available power from the on-vehicle power supply (step S455), and sends out the calculated result to the function-classified power distribution unit 382. This available power is computed based on data indicative of battery current, battery voltage, and the number of rotations and generated conditions of the generator.

Then the processing is shifted to step S456, where the function-classified power distribution unit 382, which has received the information about the priority and necessary power to and of each group and the available power, determines whether or not the available power is equal to or higher than an amount of total necessary power (which is a sum of necessary power amounts for all the groups). If the determination is affirmative (YES), it is unnecessary to limit the drive of the loads, so that the processing is made to proceed to step S460. At this step S460, information indicating the amounts of power to be supplied (, which are amounts as the respective groups request) is sent to the individual load power distribution units 383a to 383f. Responsively to this output, each unit 383a (to 383f) provides, at step S461, the information indicting the amount of power to be supplied to the load priority/necessary power calculation units 384a1 to 384a2 (to 384f1 to 384f2) placed under the control of each unit 383a (to 383f). And the processing goes to step S459.

Meanwhile, at step S456, if it is determined that the available power is less than an amount of total necessary power (NO), the processing is shifted to step S457, the function-classified power distribution unit 382 works as below. In other word, this unit 382 calculates amounts of power to be supplied to the respective groups, and information about the calculated results is sent group by group to the individual load power distribution units 383a to 383f, respectively. The amount of power to be supplied to each group of loads is computed based on the priority and necessary power to and from each group, and the amounts of necessary power for the respective groups are ranked in the priority descending order, but not to exceed the available power amount. This computation and ranking process finally decides the amounts of necessary power for the groups.

The individual load power distribution units 383a to 383f, which have received the information showing the amounts of necessary power, carries out the processing at step S458. That is, each unit 383a (to 383f) calculates an amount of power to be supplied each load controlled by each unit itself 383a (to 383f), and the calculated result is sent to the corresponding load priority/necessary power calculation units 384a1 to 384a2 (to 384f1 to 384f2). The amount of power to be supplied to each load is computed based on the priority and necessary power to and from each load, and the amounts of necessary power of the respective loads are ranked in the priority descending order, but not to exceed the available power amount. This computation and ranking process finally decides the amounts of necessary power of each load.

Since each unit 384a1 (to 384f2) has received the information about the amount of power to be supplied at either step S458 or S461, each unit 384a1 (to 384f2) performs its processing at step S459. Namely, each unit 384a1 (to 384f2) sends, as a power command value, the amount of power to be supplied to each corresponding load control unit 110a (to 110e) via the multiple signal transmission line 106. Each control unit 110a (to 110e) controls each load not to exceed the amount of power to be supplied.

Hence, the control according to the eighth embodiment makes it possible that, in the case that an amount of total necessary power from the respective loads reaches an amount of power available from the power supply, loads having lower load priorities, which belong to groups whose group priories are lower, are subjected to limitations in consuming the power. This prevents the significant loads from malfunctioning, even in the case that an overload to the power supply system occurs.

Further, the inputted information about vehicle conditions is taken into account when the group priorities and/or load priorities are calculated. This makes it possible that, unlike the conventional, the priority to be given to each electrical load is dynamically changed, load by load or group by group, depending on temporal fluctuations in the vehicle conditions including load conditions. The power is therefore distributed at any time in an optimum manner.

The electrical loads are divided into plural load groups in consideration of the functions of each load (i.e, the loads of each load group have the common vehicle functions). Hence, the power distribution can be optimized among the load groups. Such functions include an always-operation function that is indispensable and functions necessary when a vehicle runs, such as functions for running, air conditioning, and lighting.

Further, the group priority is computed based on a current value concerning the necessity of a vehicle function assigned to each group, the necessity being decided on the inputted information about vehicle conditions. Specifically, each group priority is computed, every vehicle's group function, by comparing a current value with an optimum value or target value. Hence, the group priority can be adjusted (increased or decreased) in dependence upon the necessity of a function assigned to each group (that is, depending on how far the current value is from the optimum or target value). It is therefore possible to distribute, group by group, the available power to the loads in an optimum manner, in which the load group(s) having higher group priorities receives the power in preference to others.

In addition, in the eighth embodiment, the warmed-up state of a vehicle is detected and its detected information is used to calculate one or more load groups to which electrical loads relating to the warm-up belong. Hence the warmed-up state is reflected in the group priorities of the load groups relating the warm-up such that such group priorities are raised only when the vehicle is warmed up. When the available power is short, power to be supplied to the remaining load groups other than the warm-up can be increased immediately after finishing the warm up. The load groups concerning the warm-up can therefore be suppressed from being driven unnecessarily.

Further, a brightness level outside a vehicle is detected and the detected brightness level is reflected in calculating the group priorities. Hence it is unnecessary to drive the lamps of the vehicle because it is still bright outside the vehicle, the priorities of loads that belong to the groups concerning with the lightening can be lowered. As a result, power to be distributed to the other groups can be raised if the available power is short.

In the eighth embodiment, one or more predetermined group priorities can be set to a value that is always higher than other ones. Hence significant loads can be assigned to one or more load groups whose priorities are always higher than the others, resulting in that the necessary power to the significant loads is secured without fail.

Still, when it is necessary to increase or decrease electrical loads or exchange electrical loads, it is sufficient to modify only a load priority/necessary power calculation unit to which the loads belong group by group. If vehicles varies but are still the same type, the same driving feeling can be given to crews during a time when vehicle's electrical loads are limited from being driven. Operations for such modification can be finished with less development steps.

The power distributing technique according to this eighth embodiment is also advantageous in developing new vehicles. Conventionally, a large number of electrical loads can be adjusted individually in a relationship among relative levels of priorities to be given to the loads from the beginning of the development. Hence it was impossible to begin the adjustment until all the loads are collected together. Further, work for the adjustment is complicated, because a large number of electrical loads should be adjusted. However, using the technique provided by the eighth embodiment improves such conventional difficulties. That is, an order of priorities for distributing the power to each load group can be decided through the foregoing priority producing algorism, so that relative relationships among the priorities of the respective electrical loads are adjusted group by group and adjusted in parallel among the load groups. It is therefore possible to efficiently adjust the relative relationships among the levels of the priorities.

There can also be provided a modification of the above eighth embodiment in which the group priorities are decided based on vehicle information in relation to the necessity of functions provided by each load group. Instead of this, the group priorities may be decided in advance. The load priorities may be calculated as well based on vehicle information in the similar manner to the calculation of the foregoing group priorities.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application Nos. 2002-300317 filed on Oct. 15, 2002; 2002-311466 filed on Oct. 25, 2002; 2003-185651 filed on Jun. 27, 2003 including the specification, claims, drawings and summary is incorporated herein by reference in its entirety.

What is claimed is:

1. An apparatus for driving and controlling a plurality of on-vehicle electrical loads, comprising:
   an on-vehicle power supply configured to generate power to be supplied the loads to each of which a priority is given, the plurality of priorities being used for distributing the generated power to the loads;
   a power calculating device configured to calculate a currently available amount of the power to be supplied from the power supply;
   a power-consumption calculating device calculating an amount of necessary power of each load and an amount of minimum necessary power of each load on the basis of information in relation to the vehicle condition, the information including conditions of the loads, the necessary power being defined as a power consumption of each load on condition that there is no limitation in supplying the power to the loads, and the minimum necessary power being defined as a minimum power consumption necessary for performing a function given to each load;
   a priority changing device configured to change one or more of the priorities on the basis of the information;
   a command calculating device calculating a command value indicative of an amount of the power to be supplied to the loads by using the priorities, the amount of the necessary power, and the amount of the minimum necessary power on condition that a sum of the power to be supplied to the loads being kept within the currently available amount of the power and the power to be supplied to each load being either zero or more than the minimum necessary power; and
   a controller configured to control the power to be distributed to each of the loads on the basis of the command value.

2. The apparatus according to claim 1, wherein the priority changing device includes
   detecting means for detecting a period of time counted from a time instant at which a request for supplying the power to the load is issued, to a time instant at which a predetermined period of time passes after supplying the power to the load is started, the normal priority being provided in a normal state of the apparatus, and
   means for, load by load, raising the priority in level than a normal priority given to each load during the period of time detected by the detecting means.

3. The apparatus according to claim 1, wherein the priority changing device includes
   determining means for determining whether or not the power to be supplied to the load is lower than the necessary power of the load and
   means for changing, load by load, a level of the priority given to a load of the loads on the basis of the information originated from a crew on the vehicle, in cases where the determining means determines that the power to be supplied to the load is lower than the necessary power of the load.

4. The apparatus according to claim 1, wherein the priority changing device includes
   determining means for determining whether or not the power to be supplied to the load is lower than the necessary power of the load, a memorizing device memorizing information about record of operations directed to each load and done by a crews, and a changing device changing a level of the priority given to the load on the basis of the memorized information about the record of operations, in cases where the determining means determines that the power to be supplied to the load is lower than the necessary power of the load, the operation record information composing the information.

5. The apparatus according to claim 4, wherein the priority changing device includes means for detecting a period of time counted from at a time instant when the power supplied to the load comes below the necessary power of the load, to a time instant when a predetermined period of time passes after the power supplied to the load comes below the necessary power and a determination device determining whether or not an operation for increasing and decreasing an output of the load has been performed a predetermined number of times or more during the period of time detected by the detecting means.

6. The apparatus according to claim 1, wherein the priority changing device is configured to have the priorities which are sectioned into a plurality of priority ranges depending on the levels thereof, rankings of the priorities being fixed within each of the priority ranges.

7. The apparatus according to claim 1, wherein the priority changing device includes a device deciding the one or more priorities on the basis of a difference between a current level of an operating condition of each load and a target level of the operating condition of the load.

8. The apparatus according to claim 1, wherein the priority changing device includes detecting means for detecting a period of time counted from a time instant at which a request for supply the power to the load is issued, to either a first time instant at which a predetermined period of time passes after supplying the power to the load is started or a second time instant at which supplying the power to the load is started, the normal priority being provided in a normal state of the apparatus, and means for, load by load, lowering the priority in level than a normal priority given to a load of the loads during the period of time detected by the detecting means.

9. The apparatus according to claim 1, wherein the command calculating device is configured to calculate the command value for each load so that the power is distributed to the loads in the descending order of the priorities.

10. The apparatus according to claim 1, wherein the power-consumption calculating device includes detecting means for detecting a period of time counted from a time instant at which a request for supply the power to the load is issued, to a time instant at which a predetermined period of time passes after supplying the power to the load is started, the normal levels being provided in a normal state of the apparatus, and a device raising, load by load, amounts of both the necessary power and the minimum necessary power than normal levels given to a load of the loads during the period of time detected by the detecting means.

11. The apparatus according to claim 10, wherein the power supply is provided with a generator generating the electric power and an energy storage device into which the generated electric power is accumulated, the apparatus further comprising:

a device calculating an amount of the power generated by the generator;

a device calculating a requested amount of power to be charged to the energy storage device; and a device controlling the generator so that the amount of the generated power increases, when a total amount of both a sum of the necessary power of the loads and the requested amount of power to be charged exceeds the amount of the generated power.

12. The apparatus according to claim 1, wherein the loads include a load having a step-like changing power consumption characteristic and the command calculating device is configured to calculate the command value indicative of the amount of the power that is consistent with one of power consumption amounts provided at each step of the step-like changing power consumption characteristic of the load.

13. The apparatus according to claim 1, wherein the command calculating device includes a calculation/supply element calculating the command value indicative of the amount of the power so that an amount of power equal to the necessary power of a given load of the loads is supplied to the given load and an amount of power equal to the minimum necessary power is supplied to remaining loads other than the given load in a descending order of the priorities given to the remaining loads within a power region up to the currently available power.

14. The apparatus according to claim 13, wherein the command calculating device includes a determination element determining whether or not a condition that the available power is higher than a sum of power distributed to the loads is met at a last time of processing; and a supply element supplying, to the remaining loads, an amount of power corresponding to a difference between the currently available power and the sum of power distributed to the loads at the last time of processing in the descending order of the priorities given to the remaining loads, when the condition is met.

15. The apparatus according to claim 1, wherein the power-consumption calculating device comprises a plurality of demand calculating devices each calculating, load by load, the priority, the amount of the necessary power, and the amount of the minimum necessary power, the command calculating device includes a calculating means for calculating the command value on the basis of the priority, the amount of the necessary power, and the amount of the minimum necessary power provided by the plurality of demand calculating devices, and the controller includes a plurality of load controlling devices to individually control the power to be supplied to the plurality of loads on the basis of the command value provided by the calculating means, wherein each demand calculating device is incorporated in each load controlling device.

16. The apparatus according to claim 1, wherein the plurality of loads are classified into a plurality of different load groups of which priority ranges are different from each other, the controller includes a power distributing device distributing the power to the loads in different ways, load group by load group.

17. The apparatus according to claim 1, wherein the plurality of loads are classified into two load groups consisting of an upper-priority load group of which priorities are higher and a lower-priority load group of which priorities are lower, and wherein, for the upper-priority load group, a power higher than the minimum necessary power but lower than the necessary power is distributed to the loads of the upper-priority load group in a descending order of the priorities, on condition that a sum of the power to be distributed to the loads of the upper-priority load group is maintained within the available power; and for the lower-priority load group, a power equal to the minimum necessary power is distributed to the loads of the lower-priority load group in a descending order of the priorities, on condition that a sum of the power to be distributed to the loads of the lower-priority load group is maintained within a difference power obtained by subtracting from the available power the sum of the power distributed to the loads of the upper-priority load group, wherein in the case that the difference power is higher than the sum of the power to be distributed to the loads of the lower-priority load group, an amount of power corresponding to a difference between the difference power and the sum is distributed to the loads of the lower-priority load group in the descending order of the priorities.

18. The apparatus according to claim 1, wherein one of the loads is a blower of an on-vehicle air conditioner, the blower also working as a defroster by blowing air toward a window glass of a vehicle, wherein the priority changing device is configured to raise the priority given to the blower when the blower is used as the defroster.

19. The apparatus according to claim 1, wherein the power-consumption calculating device includes means for treating, of the plurality of electrical loads, N-pieces (N: equal to or larger than 2) of electrical loads, to which the power supply is out of control, as imaginary electrical load of "N−1" pieces or less each consuming the necessary power.

20. The apparatus according to claim 19, wherein the power-consumption calculating device includes an element for correcting the necessary power of either one of the electrical loads of which power supply is out of control or the imaginary electrical loads on the basis of an actually measured amount of power consumption.

21. An apparatus for driving and controlling a plurality of on-vehicle electrical loads, comprising:

an on-vehicle power supply configured to generate power to be supplied to the loads to each of which a priority is given, the plurality of priorities being used for distributing the generated power to the loads;

a power calculating device configured to calculate a currently available amount of the power to be supplied from the power supply, a power-consumption calculating device calculating an amount of necessary power of each load and an amount of minimum necessary power of each load on the basis of information in relation to the vehicle condition, the information including conditions of the loads, the necessary power being defined as a power consumption of each load on condition that there is no limitation in supplying the power to the loads, and the minimum necessary power being defined as a minimum power consumption necessary for performing a function given to each load;

a command calculating device calculating a command value indicative of an amount of the power to be supplied to the loads by using the priorities, the amount of the necessary power, and the amount of the minimum necessary power on condition that a sum of the power to be supplied to the loads being kept within the currently available amount of the power and the power to be supplied to each load being either zero or more than the minimum necessary power; and a controller configured to control the power to be distributed to each of the loads on the basis of the command value.

22. The apparatus according to claim 21, wherein the power-consumption calculating device includes detecting means for detecting a period of time counted from a time instant at which a reciuest for supply the power to the load is issued, to a time instant at which a predetermined period of time passes after supplying the power to the load is started, the normal levels being provided in a normal state of the apparatus, and a device raising, load by load, amounts of both the necessary power and the minimum necessary power than normal levels given to a load of the loads during the period of time detected by the detecting means.

23. The apparatus according to claim 22, wherein the power supply is provided with a generator generating the electric power and an energy storage device into which the generated electric power is accumulated, the apparatus further comprising:

a device calculating an amount of the power generated by the generator;

a device calculating a requested amount of power to be charged to the energy storage device; and a device controlling the generator so that the amount of the generated power increases, when a total amount of both a sum of the necessary power of the loads and the requested amount of power to be charged exceeds the amount of the generated power.

24. The apparatus according to claim 21, wherein the loads include a load having a step-like changing power consumption characteristic and the command calculating device is configured to calculate the command value indicative of the amount of the power that is consistent with one of power consumption amounts provided at each step of the step-like changing power consumption characteristic of the load.

25. The apparatus according to claim 21, wherein the command calculating device includes a calculation/supply element calculating the command value indicative of the amount of the power so that an amount of power equal to the necessary power of a given load of the loads is supplied to the given load and an amount of power equal to the minimum necessary power is supplied to remaining loads other than the given load in a descending order of the priorities given to the remaining loads within a power region up to the currently available power.

26. The apparatus according to claim 25, wherein the command calculating device includes a determination element determining whether or not a condition that the available power is higher than a sum of power distributed to the loads is met at a last time of processing; and a supply element supplying, to the remaining loads, an amount of power corresponding to a difference between the currently available power and the sum of power distributed to the loads at the last time of processing in the descending order of the priorities given to the remaining loads, when the condition is met.

27. The apparatus according to claim 21, wherein the power-consumption calculating device comprises a plurality of demand calculating devices each calculating, load by load, the priority, the amount of the necessary power, and the amount of the minimum necessary power, the command calculating device includes a calculating means for calculating the command value on the basis of the priority, the amount of the necessary power, and the amount of the minimum necessary power provided by the plurality of demand calculating devices, and the controller includes a plurality of load controlling devices to individually control the power to be supplied to the plurality of loads on the basis of the command value provided by the calculating means, wherein each demand calculating device is incorporated in each load controlling device.

28. A method for driving and controlling a plurality of on-vehicle electrical loads, comprising steps of:

generating power to be supplied the loads to each of which a priority is given, the plurality of priorities being used for distributing the generated power to the loads;

calculating a currently available amount of the power to be supplied from the power supply;

calculating an amount of necessary power of each load and an amount of minimum necessary power of each load on the basis of information in relation to the vehicle condition, the information including conditions of the loads, the necessary power being defined as a power consumption of each load on condition that there is no limitation in supplying the power to the loads, and the minimum necessary power being defined as a minimum power consumption necessary for performing a function given to each load;

changing one or more of the priorities on the basis of the information;

calculating a command value indicative of an amount of the power to be supplied to the loads by using the priorities, the amount of the necessary power, and the amount of the minimum necessary power on condition that a sum of the power to be supplied to the loads being kept within the currently available amount of the power and the power to be supplied to each load being either zero or more than the minimum necessary power; and controlling the power to be distributed to each of the loads on the basis of the command value.

29. An apparatus for driving and controlling a plurality of on-vehicle electrical loads, an on-vehicle power supply generating power to be supplied the loads to each of which a load priority is given, the load priority indicative of a priority order for supplying the power among the loads, the apparatus compnsing:

a power calculating device configured to calculate a currently available amount of the power to be supplied from the power supply;

a first calculating device configured to calculate an amount of first power to be supplied to each load group on the basis of a group priority indicative of a priority order for supplying the power among the load groups, each load group being any one of a plurality of groups obtained by dividing the plurality of loads, a sum of the first power to each load group being kept within the currently available amount of the power;

a second calculating device configured to calculate an amount of second power to be supplied to each load belonging to any load group on the basis of the load priority, a sum of the second power to each load belonging to the load group being kept within the amount of the first power supplied to the load group; and a controller configured to control the power to be distributed to each of the loads on the basis of a command value indicative of the amount of the first power to each load.

30. The apparatus according to claim 29, further comprising a third calculating device configured to calculate at least one of the group priority and the load priority on the basis of information about conditions of a vehicle.

31. The apparatus according to claim 30, wherein each of the plurality of load groups is composed of one or more loads whose functions concerning the vehicle are classified into the same category.

32. The apparatus according to claim 31, wherein the third calculating device is configured to calculate the group priority based on a current value indicative of necessity for the vehicle functions for any group decided by the information.

33. The apparatus according to claim 31, further comprising a detector to detect a warm-up state of the vehicle, wherein the third calculating device is configured to calculate the group priority based on the detected warm-up state.

34. The apparatus according to claim 31, further comprising a detector to detect a brightness level in environment around the vehicle, wherein the third calculating device is configured to calculate the group priority based on the detected brightness level.

35. The apparatus according to claim 30, wherein the third calculating device is configured to calculate the group priority to be given to a specific load group, which is higher in a level than the group priority to be given to one or more remaining load groups.

* * * * *